US010062163B2

(12) United States Patent
Miyazaki

(10) Patent No.: US 10,062,163 B2
(45) Date of Patent: Aug. 28, 2018

(54) HEALTH INFORMATION SERVICE SYSTEM

(71) Applicants: KABUSHIKI KAISHA TOSHIBA, Tokyo (JP); TOSHIBA SOLUTIONS CORPORATION, Kawasaki-shi, Kanagawa (JP)

(72) Inventor: Shingo Miyazaki, Tokyo (JP)

(73) Assignees: Kabushiki Kaisha Toshiba, Tokyo (JP); Toshiba Solutions Corporation, Kawasaki, Kanagawa (JP)

( * ) Notice: Subject to any disclaimer, the term of this patent is extended or adjusted under 35 U.S.C. 154(b) by 0 days.

(21) Appl. No.: 15/301,093

(22) PCT Filed: Apr. 14, 2015

(86) PCT No.: PCT/JP2015/002060

§ 371 (c)(1),
(2) Date: Sep. 30, 2016

(87) PCT Pub. No.: WO2015/159533

PCT Pub. Date: Oct. 22, 2015

(65) Prior Publication Data

US 2017/0024885 A1 Jan. 26, 2017

(30) Foreign Application Priority Data

Apr. 15, 2014 (JP) ................................. 2014-083841

(51) Int. Cl.
*A45D 44/00* (2006.01)
*G06T 7/00* (2017.01)

(52) U.S. Cl.
CPC ............ *G06T 7/0012* (2013.01); *A45D 44/00* (2013.01); *A45D 44/005* (2013.01);
(Continued)

(58) Field of Classification Search
CPC .............. A45D 2044/007; A45D 44/00; A45D 44/005; G06T 2207/10004; G06T 2207/30196
See application file for complete search history.

(56) References Cited

FOREIGN PATENT DOCUMENTS

| | | |
|---|---|---|
| JP | 2004-357099 | 12/2004 |
| JP | 2006-309627 | 11/2006 |

(Continued)

OTHER PUBLICATIONS

International Search Report from the Japanese Patent Office for International Application No. PCT/JP2015/002060, dated Jun. 16, 2015.

*Primary Examiner* — Siamak Harandi
(74) *Attorney, Agent, or Firm* — Finnegan, Henderson, Farabow, Garrett & Dunner, L.L.P.

(57) ABSTRACT

[PROBLEM] To assist in improvement of health and beauty of a user based on collected health and beauty statuses of the user and statuses of actions regarding health and beauty performed by the user.
[SOLVING MEANS]
A health information system according to embodiments is a system including a measurement apparatus configured to measure a health and beauty status of a user, an action status acquirement apparatus configured to acquire a history of actions regarding health and beauty performed by the user, and a management apparatus connected over a network to the measurement apparatus and the action status acquirement apparatus. The management apparatus associates health and beauty measurement information with the history of actions and stores the health and beauty measurement information and the history of actions of the user daily in time sequence. The management apparatus extracts a time-series pattern representing a change or no change of the health and beauty status of the user based on the time-series
(Continued)

health and beauty measurement information in the past, extracts a health and beauty action performed by the user or a health and beauty action not performed by the user when the extracted time-series pattern is found, and uses the health and beauty measurement information before and after the health and beauty action or in a nonperformance period to produce performance or nonperformance effect evaluation information of the extracted health and beauty action.

13 Claims, 15 Drawing Sheets

(52) U.S. Cl.
CPC .................. *A45D 2044/007* (2013.01); *G06T 2207/10004* (2013.01); *G06T 2207/30196* (2013.01)

(56) References Cited

FOREIGN PATENT DOCUMENTS

| | | |
|---|---|---|
| JP | 2007-204 | 1/2007 |
| JP | 2013-109700 | 6/2013 |
| JP | 2013-143004 | 7/2013 |

【FIG1】
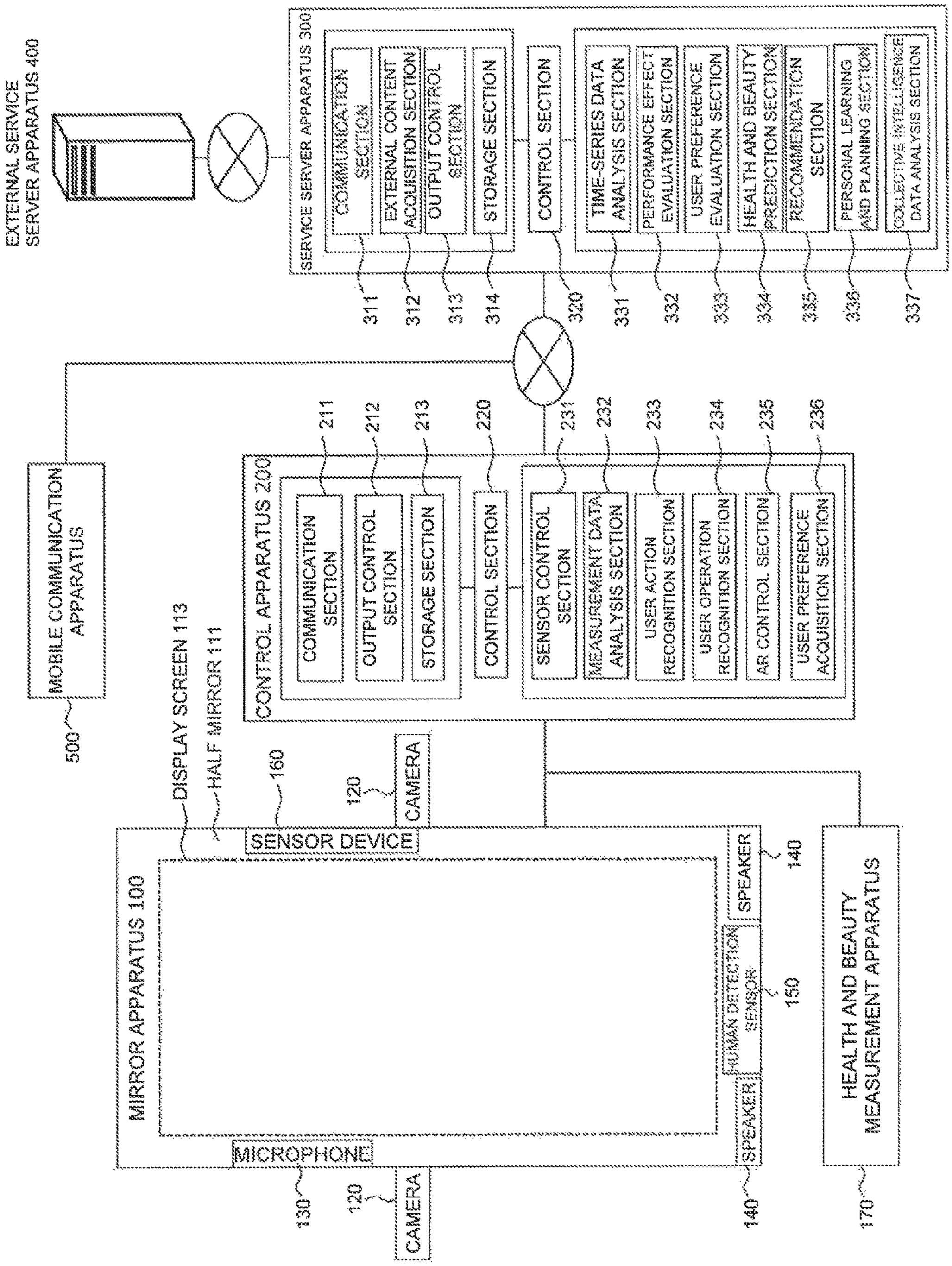

【FIG2B】
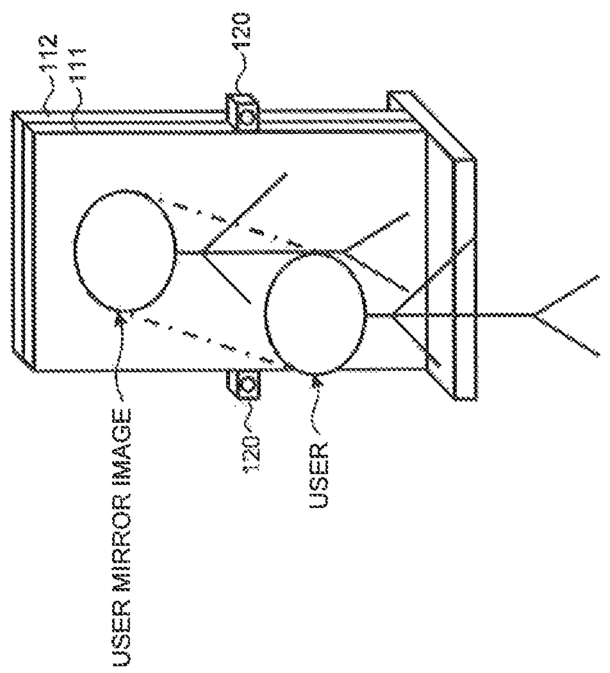
【FIG2A】
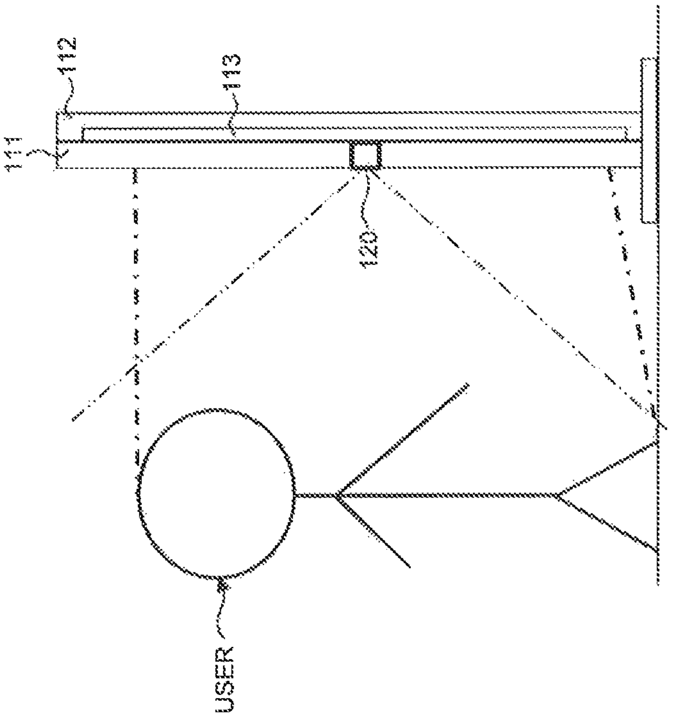

【FIG3】
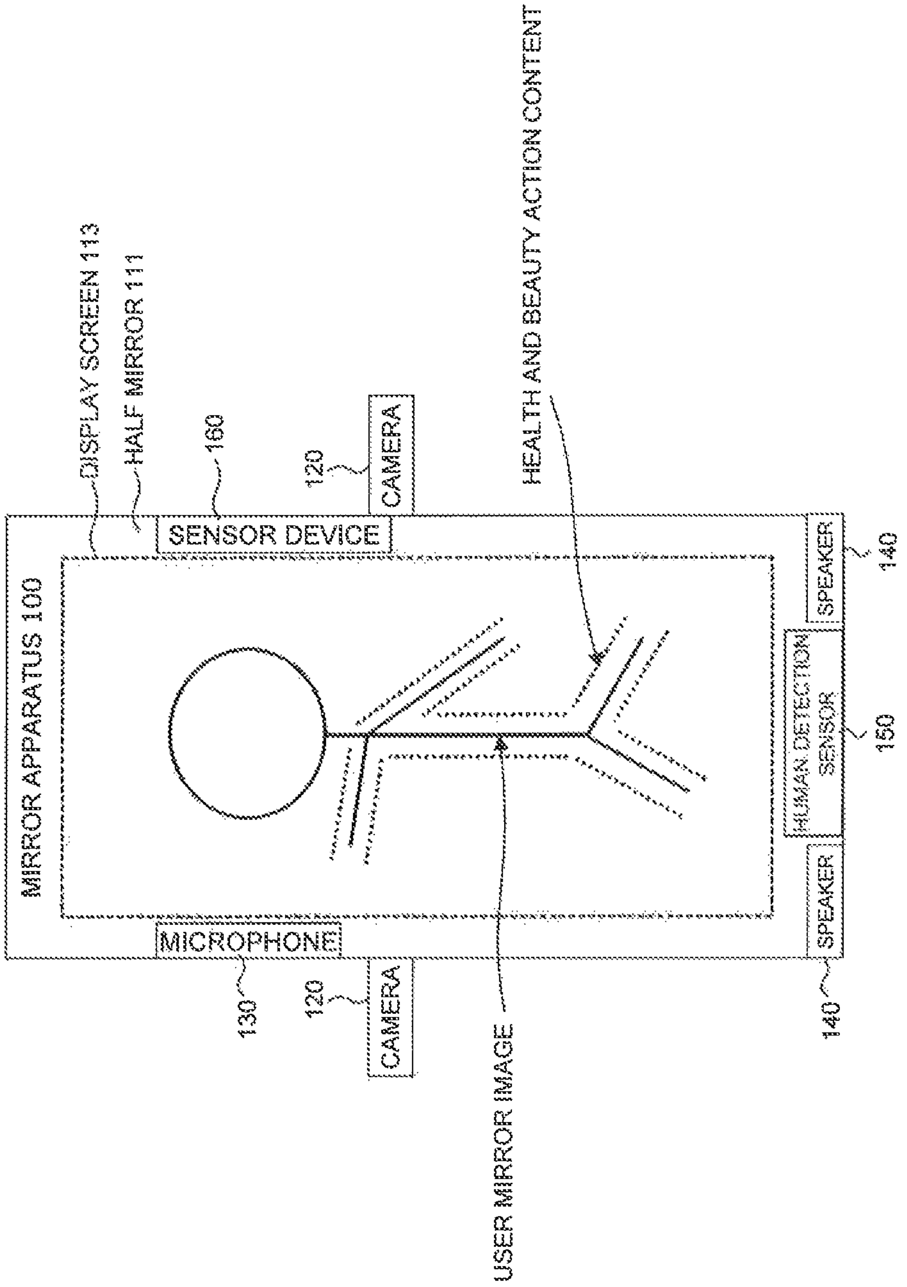

【FIG4】
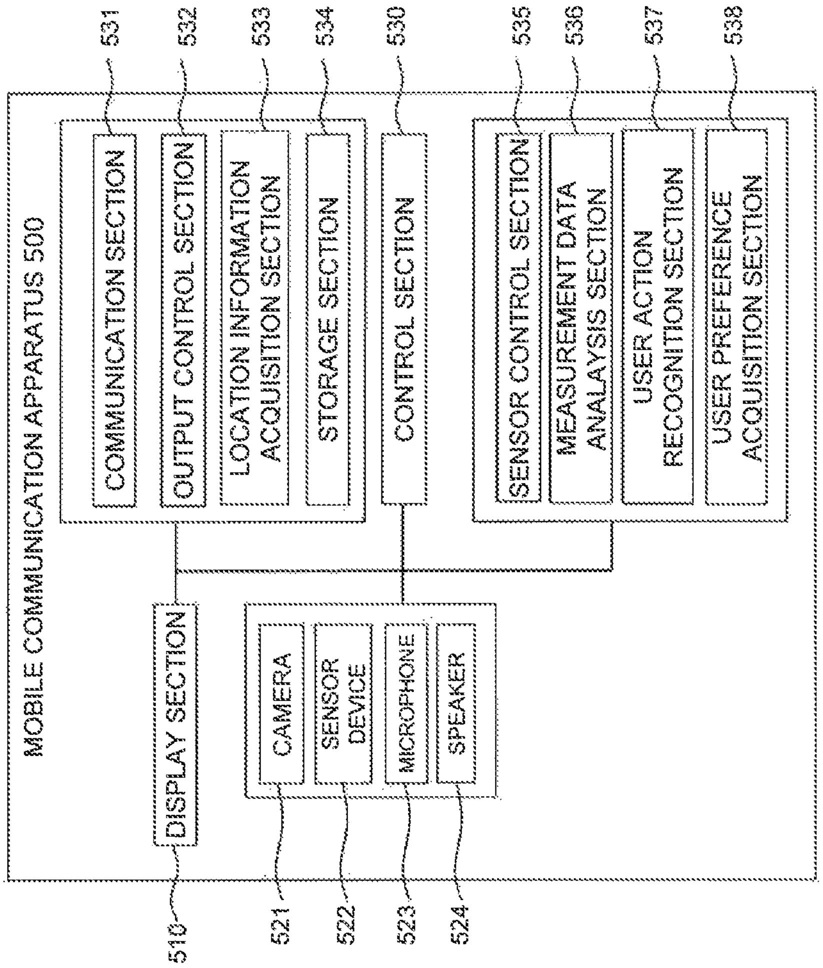

【FIG5】

| USER ID | DEVICE TYPE | DEVICE ID |
|---|---|---|
| 0001 | MOBILE COMMUNICATION APPARATUS | SH0001 |
| | MIRROR APPARATUS (LARGE) | ML0001 |
| | MIRROR APPARATUS (MEDIUM) | MM0002 |
| 0002 | MOBILE COMMUNICATION APPARATUS | SH0002 |
| 0003 | MOBILE COMMUNICATION APPARATUS | SH0003 |
| | MIRROR APPARATUS (LARGE) | ML0001 |
| | MIRROR APPARATUS (MEDIUM) | MM0002 |
| 0004 | MIRROR APPARATUS (LARGE) | ML0003 |
| 0005 | MOBILE COMMUNICATION APPARATUS | SH0004 |
| | MIRROR APPARATUS (SMALL) | MS0004 |

【FIG.6】

| HEALTH AND BEAUTY MANAGEMENT INFORMATION | | | DATE/DAY OF WEEK | | | | | | |
|---|---|---|---|---|---|---|---|---|---|
| | | | 2014/03/06 | 2014/03/07 | 2014/03/08 | 2014/03/09 | 2014/03/10 | 2014/03/11 | 2014/03/12 |
| DB TYPE | INFORMATION TYPE | DATA ITEM | THURSDAY | FRIDAY | SATURDAY | SUNDAY | MONDAY | TUESDAY | WEDNESDAY |
| HEALTH AND BEAUTY ENVIRONMENT INFORMATION DB | HEALTH AND BEAUTY INFORMATION | BASAL BODY TEMPERATURE | 36.55 | 36.52 | 36.35 | 36.21 | 36.72 | 36.82 | 36.85 |
| | | MENSTRUAL CYCLE | FOLLICULAR PHASE | OVULATORY PHASE | OVULATORY PHASE | OVULATORY PHASE | OVULATORY PHASE | LUTEAL PHASE | LUTEAL PHASE |
| | | WEIGHT | 46.2 | 46.7 | 47.9 | 46.7 | 46.8 | 47.2 | 47.6 |
| | | DEGREE OF BODY MISALIGNMENT | HORIZONTAL1.2° FORWARD2.1° | HORIZONTAL1.2° FORWARD1.9° | HORIZONTAL1.2° FORWARD2.1° | HORIZONTAL1.2° FORWARD2.1° | HORIZONTAL1.2° FORWARD2.1° | HORIZONTAL1.3° FORWARD2.2° | HORIZONTAL1.3° FORWARD2.2° |
| | | DEGREE OF FACE SAG(0-10) | 1 | 2 | 3 | 4 | 4 | 3 | 3 |
| | | DEGREE OF FACE SWELLING(0-6) | 1 | 2 | 6 | 4 | 3 | 3 | 3 |
| | | SKIN MOISTURIZING LEVEL(0-100) | 87 | 85 | 77 | 79 | 73 | 67 | 66 |
| | | SKIN CONDITION SCORE(0-10) | 10 | 9 | 4 | 6 | 7 | 5 | 4 |
| | | THERMOGRAPHIC PATTERN | HIGH COLDNESS OF LOWER BODY | LOW COLDNESS OF LOWER BODY | HIGH COLDNESS OF LOWER BODY | HIGH COLDNESS OF LOWER BODY | LOW COLDNESS OF LOWER BODY | LOW COLDNESS OF LOWER BODY | LOW COLDNESS OF LOWER BODY |
| | | SLEEP QUALITY(0-100) | 89 | 87 | 72 | 83 | 80 | 76 | 76 |
| | | DEGREE OF LEG SWELLING(0-6) | 5 | 3 | 6 | 5 | 3 | 3 | 3 |
| | | LEVEL OF BREATH ODOR(0-5) | 1 | 2 | 5 | 4 | 3 | 3 | 3 |
| | | FACIAL EXPRESSION | CHEERFUL | CHEERFUL | STERN | STERN | SOMBER | TIGHT | TIGHT |
| | | NUMBER OF SNEEZES | 28 | 8 | 3 | 2 | 6 | 29 | 25 |
| | INDOOR ENVIRONMENT INFORMATION | INDOOR TEMPERATURE | 10.2 | 9.8 | 13.1 | 11.1 | 15.3 | 15.3 | 17.2 |
| | | INDOOR HUMIDITY | 43 | 43 | 45 | 78 | 66 | 43 | 43 |
| EXTERNAL SERVICE CONTENT INFORMATION DB | METEOROLOGICAL INFORMATION | WEATHER | CLEAR | CLOUDY WITH OCCASIONAL SUNNY | CLOUDY | RAINY | RAINY AND OCCASIONALLY CLOUDY | CLEAR | SUNNY |
| | | ATMOSPHERIC TEMPERATURE(°C) | 5.8 | 4.4 | 10.1 | 8.1 | 12.3 | 13.3 | 15.4 |
| | | HUMIDITY(%) | 35 | 57 | 47 | 65 | 72 | 32 | 35 |
| | | WIND VELOCITY(m/s) | 6.9 | 4.9 | 9.5 | 2.8 | 3.8 | 7.1 | 4.8 |
| | | DISPERSING POLLEN COUNT (PER CUBIC METER) | 220 | 20 | 2 | 0 | 0 | 303 | 221 |
| | | AMOUNT OF ULTRAVIOLET LIGHT(0-18) | 2.5 | 1.9 | 1.7 | 1.3 | 1.8 | 2.6 | 1.9 |
| HEALTH AND BEAUTY ACTION INFORMATION DB | HEALTH AND BEAUTY ACTION | LYMPHATIC MASSAGE ※ 2 | PERFORMED/100 MARKS | NOT PERFORMED | PERFORMED/70 MARKS | PERFORMED/70 MARKS | PERFORMED/80 MARKS | PERFORMED/70 MARKS | PERFORMED/70 MARKS |
| | | STRETCHING WHILE DOING SOME OTHER THING ※ 3 | PERFORMED/100 MARKS | NOT PERFORMED | PERFORMED/100 MARKS | PERFORMED/100 MARKS | PERFORMED/100 MARKS | PERFORMED/100 MARKS | PERFORMED/100 MARKS |
| | | MASSAGE OF FOOT TRIGGER POINTS ※ 2 | PERFORMED/100 MARKS | NOT PERFORMED | PERFORMED/100 MARKS | PERFORMED/100 MARKS | PERFORMED/100 MARKS | PERFORMED/50 MARKS | PERFORMED/100 MARKS |
| | | CALISTHENICS | PERFORMED/100 MARKS | PERFORMED/100 MARKS | NOT PERFORMED/0 MARKS | PERFORMED/100 MARKS | PERFORMED/100 MARKS | PERFORMED/100 MARKS | PERFORMED/100 MARKS |
| | | WALKING | PERFORMED/45 MINUTES | NOT PERFORMED/0 MINUTES | NOT PERFORMED/0 MINUTES | NOT PERFORMED/0 MINUTES | PERFORMED/45 MINUTES | 0 | PERFORMED/45 MINUTES |
| | | EXERCISE ※ 1 | PERFORMED/100 MARKS | NOT PERFORMED/0 MARKS | NOT PERFORMED/0 MARKS | NOT PERFORMED/0 MARKS | NOT PERFORMED/0 MARKS | NOT PERFORMED/0 MARKS | NOT PERFORMED/0 MARKS |
| | | SUPPLEMENT ※ 3 | TAKEN/100% | TAKEN/50% | NOT TAKEN/0% | TAKEN/100% | TAKEN/100% | TAKEN/100% | TAKEN/100% |
| | | HEALING BGM ※ 2 | NONE | NONE | REPRODUCED/70% | REPRODUCED/100% | REPRODUCED/100% | REPRODUCED/100% | REPRODUCED/100% |
| PERSONAL PREFERENCE EVALUATION DB | LIVING ACTIVITY RECORD | GET-UP TIME | 5:30 | 5:30 | 9:00 | 6:00 | 5:30 | 4:30 | 5:30 |
| | | BEDTIME | 23:00 | 25:30 | 23:30 | 23:00 | 23:00 | 22:30 | 23:00 |
| | | BREAKFAST (TIME/KCAL) | 6:00 (300) | 6:00 (330) | 9:30 (50) | 6:30 (300) | 6:00 (300) | 6:00 (300) | 6:00 (200) |
| | | LUNCH (TIME/KCAL) | 12:00 (750) | 12:00 (600) | 13:00 (200) | 11:30 (780) | 12:00 (400) | 12:00 (340) | 12:00 (800) |
| | | DINNER (TIME/KCAL) | 18:30 (550) | 19:00 (1200) | 18:30 (400) | 18:30 (600) | 18:30 (550) | 21:30 (350) | 18:30 (550) |
| | | GO-HOME TIME | 18:00 | 24:00 | AT HOME | 18:30 | 18:00 | 20:30 | 18:00 |
| | | BATH TIME | 20:45 | 24:15 | 20:10 | 20:30 | 20:45 | 21:00 | 20:45 |
| | | AMOUNT OF ALCOHOL INTAKE | NONE | LARGE | NONE | NONE | SMALL | NONE | NONE |
| | ACTION PLANNING | SCHEDULE | 10:00 VISIT COMPANY A<br>13:00 VISIT COMPANY B<br>15:00 VISIT COMPANY C | 19:00 WOMEN'S PARTY | 10:00 SET WASHING MACHINE | 10:00 HAIR SALON | 10:00 REGULAR MEETING | 10:00 CONFERENCE<br>20:30 SUBMIT DOCUMENT | 13:00 EXHIBIT |
| | HEALTH AND BEAUTY FEELING | PHYSICAL CONDITION | GOOD | SO-SO | BAD | BAD | BAD | SLEEPY | SLEEPY |
| | | MOOD | GOOD | GOOD | NERVOUS | NERVOUS | SAD | DEPRESSED | DEPRESSED |
| | | HEADACHE | NONE | NONE | NONE | NONE | MILD | MODERATE | MODERATE |
| | | BACKACHE | NONE | NONE | NONE | SEVERE | SEVERE | SEVERE | MODERATE |
| | | STIFF SHOULDERS | NONE | NONE | NONE | NONE | MODERATE | SEVERE | MODERATE |
| | | JOINT PAIN | NONE | MILD | MODERATE | SEVERE | SEVERE | NONE | NONE |
| | HEALTH AND BEAUTY ACTION PREFERENCE | LYMPHATIC MASSAGE ※ 2 | PERFORMED/FEEL GOOD | NOT PERFORMED/- | PERFORMED/FEEL GOOD | PERFORMED/FEEL GOOD | PERFORMED/FEEL GOOD | PERFORMED/FEEL GOOD | PERFORMED/FEEL GOOD |
| | | STRETCHING WHILE DOING SOME OTHER THING ※ 3 | PERFORMED/FEEL GOOD | NOT PERFORMED/- | PERFORMED/FEEL GOOD | PERFORMED/FEEL GOOD | PERFORMED/FEEL GOOD | PERFORMED/FEEL GOOD | PERFORMED/FEEL GOOD |
| | | MASSAGE OF FOOT TRIGGER POINTS ※ 2 | PERFORMED/FEEL GOOD | NOT PERFORMED/- | PERFORMED/FEEL GOOD | PERFORMED/FEEL GOOD | PERFORMED/FEEL GOOD | PERFORMED/FEEL GOOD | PERFORMED/FEEL GOOD |
| | | CALISTHENICS | PERFORMED/FEEL GOOD | PERFORMED/FEEL GOOD | NOT PERFORMED/- | PERFORMED/FEEL GOOD | PERFORMED/FEEL GOOD | PERFORMED/FEEL GOOD | PERFORMED/FEEL GOOD |
| | | WALKING | PERFORMED/FEEL GOOD | NOT PERFORMED/- | NOT PERFORMED/- | PERFORMED/FEEL GOOD | PERFORMED/FEEL GOOD | NOT PERFORMED/- | PERFORMED/FEEL GOOD |
| | | EXERCISE ※ 1 | PERFORMED/BAD AT | NOT PERFORMED/- | NOT PERFORMED/- | NOT PERFORMED/- | NOT PERFORMED/- | NOT PERFORMED/- | NOT PERFORMED/- |
| | | SUPPLEMENT ※ 3 | TAKEN/LIKE | TAKEN/LIKE | NOT TAKEN/- | TAKEN/LIKE | TAKEN/LIKE | TAKEN/LIKE | TAKEN/LIKE |
| | | HEALING BGM ※ 2 | NONE/NOT INTERESTED | NONE/NOT INTERESTED | REPRODUCED/LIKE | REPRODUCED/LIKE | REPRODUCED/LIKE | REPRODUCED/LIKE | REPRODUCED/LIKE |

【FIG.7】

| HEALTH AND BEAUTY PREDICTION INFORMATION | | | DATE/DAY OF WEEK AFTER TOMORROW | | | | | | |
|---|---|---|---|---|---|---|---|---|---|
| | | | TODAY | TOMORROW | DAY AFTER TOMORROW | THREE DAYS LATER | FOUR DAYS LATER | FIVE DAYS LATER | SIX DAYS LATER |
| | | | 2014/03/24 | 2014/03/25 | 2014/03/26 | 2014/03/27 | 2014/03/28 | 2014/03/29 | 2014/03/30 |
| DB TYPE | INFORMATION TYPE | DATA ITEM | MONDAY | TUESDAY | WEDNESDAY | THURSDAY | FRIDAY | SATURDAY | SUNDAY |
| HEALTH AND BEAUTY ENVIRONMENT INFORMATION DB | HEALTH AND BEAUTY INFORMATION | MENSTRUAL CYCLE | MENSTRUAL PHASE | MENSTRUAL PHASE | FOLLICULAR PHASE | FOLLICULAR PHASE | FOLLICULAR PHASE | FOLLICULAR PHASE | FOLLICULAR PHASE |
| | | DEGREE OF FACE SWELLING(0-6) | 1 | WORRY-FREE | WORRY-FREE | WORRY-FREE | WORRY-FREE | CAUTION | WARNING |
| | | SKIN MOISTURIZING LEVEL(0-100) | 66 | CAUTION | WORRY-FREE | WORRY-FREE | CAUTION | CAUTION | CAUTION |
| | | SKIN CONDITION SCORE (0-10) | 10 | WORRY-FREE | WORRY-FREE | WORRY-FREE | WORRY-FREE | CAUTION | WARNING |
| | | THERMOGRAPHIC PATTERN | NORMAL | NORMAL | CAUTION AGAINST COLDNESS OF LOWER BODY | WARNING AGAINST COLDNESS OF LOWER BODY | NORMAL | NORMAL | NORMAL |
| | | DEGREE OF LEG SWELLING(0-6) | 5 | WORRY-FREE | CAUTION | WARNING | WORRY-FREE | WORRY-FREE | CAUTION |
| | | LEVEL OF BREADH ODOR(0-5) | 1 | WORRY-FREE | WORRY-FREE | WORRY-FREE | WORRY-FREE | CAUTION | WARNING |
| | | NUMBER OF SNEEZES | CAUTION | WARNING | WORRY-FREE | WORRY-FREE | WORRY-FREE | WARNING | CAUTION |
| EXTERNAL SERVICE CONTENT INFORMATION DB | METEOROLOGICAL INFORMATION | WEATHER | CLEAR | CLEAR | CLOUDY | RAINY | SUNNY | CLEAR | SUNNY |
| | | ATMOSPHERIC TEMPERATURE(°C) | 16.6 | 16.4 | 12.2 | 9.2 | 17.1 | 18.1 | 17.9 |
| | | HUMIDITY(%) | 33 | 37 | 47 | 85 | 35 | 32 | 35 |
| | | WIND VELOCITY(m/s) | 6.9 | 4.9 | 9.5 | 2.2 | 2.8 | 7.1 | 4.8 |
| | | DISPERSING POLLEN COUNT (PER CUBIC METER) | 220 | 323 | 20 | 0 | 45 | 303 | 223 |
| | | AMOUNT OF ULTRAVIOLET LIGHT(0-16) | 2.5 | 2.1 | 1.7 | 1.3 | 2.1 | 2.6 | 2.2 |
| PERSONAL PREFERENCE EVALUATION DB | LIVING ACTIVITY RECORD | AMOUNT OF ALCOHOL INTAKE | (NOT INPUT) | NONE | NONE | NONE | SMALL | LARGE | NONE |
| | ACTION PLANNING | SCHEDULE | 10:00 REGULAR MEETING | | 14:00 VISIT COMPANY A | 14:00 VISIT COMPANY C | 10:00 HAIR SALON<br>15:00 NAIL SALON<br>19:00 DATE | 18:30 WOMEN'S PARTY | 13:00 YOGA LESSON |
| | HEALTH AND BEAUTY FEELING | PHYSICAL CONDITION | BAD | BAD | SLEEPY | BAD | GOOD | GOOD | SLEEPY |
| | | MOOD | NERVOUS | NERVOUS | DEPRESSED | DEPRESSED | GOOD | DEPRESSED | DEPRESSED |
| | | HEADACHE | MODERATE | MILD | NONE | NONE | NONE | NONE | NONE |
| | | BACKACHE | SEVERE | MODERATE | NONE | NONE | NONE | NONE | NONE |
| | | STIFF SHOULDERS | SEVERE | MODERATE | NONE | NONE | NONE | NONE | NONE |
| | | JOINT PAIN | NONE | NONE | MODERATE | SEVERE | NONE | NONE | NONE |

【FIG.8】

| HEALTH AND BEAUTY PLANNING INFORMATION | | | DATE/DAY OF WEEK AFTER TOMORROW | | | | | | |
|---|---|---|---|---|---|---|---|---|---|
| | | | TODAY<br>2014/03/24 | TOMORROW<br>2014/03/25 | DAY AFTER TOMORROW<br>2014/03/26 | THREE DAYS LATER<br>2014/03/27 | FOUR DAYS LATER<br>2014/03/28 | FIVE DAYS LATER<br>2014/03/29 | SIX DAYS LATER<br>2014/03/30 |
| DB TYPE | INFORMATION TYPE | DATA ITEM | MONDAY | TUESDAY | WEDNESDAY | THURSDAY | FRIDAY | SATURDAY | SUNDAY |
| HEALTH AND BEAUTY ENVIRONMENT INFORMATION DB | HEALTH AND BEAUTY INFORMATION | MENSTRUAL CYCLE | MENSTRUAL PHASE | MENSTRUAL PHASE | FOLLICULAR PHASE | FOLLICULAR PHASE | FOLLICULAR PHASE | FOLLICULAR PHASE | FOLLICULAR PHASE |
| | | DEGREE OF FACE SWELLING(0-6) | 1 | WORRY-FREE | WORRY-FREE | WORRY-FREE | WORRY-FREE | CAUTION | WARNING |
| | | SKIN MOISTURIZING LEVEL (0-100) | 66 | CAUTION | WORRY-FREE | WORRY-FREE | CAUTION | CAUTION | CAUTION |
| | | SKIN CONDITION SCORE (0-10) | 10 | WORRY-FREE | WORRY-FREE | WORRY-FREE | WORRY-FREE | CAUTION | WARNING |
| | | THERMOGRAPHIC PATTERN | NORMAL | NORMAL | CAUTION AGAINST COLDNESS OF LOWER BODY | WARNING AGAINST COLDNESS OF LOWER BODY | NORMAL | NORMAL | NORMAL |
| | | DEGREE OF LEG SWELLING (0-6) | 5 | WORRY-FREE | CAUTION | WARNING | WORRY-FREE | WORRY-FREE | CAUTION |
| | | LEVEL OF BREADH ODOR(0-5) | 1 | WORRY-FREE | WORRY-FREE | WORRY-FREE | WORRY-FREE | CAUTION | WARNING |
| | | NUMBER OF SNEEZES | CAUTION | WARNING | WORRY-FREE | WORRY-FREE | WORRY-FREE | WARNING | CAUTION |
| PERSONAL PREFERENCE EVALUATION DB | ACTION PLANNING | SCHEDULE | 10:00 REGULAR MEETING | | 14:00 VISIT COMPANY A | 14:00 VISIT COMPANY C | 10:00 HAIR SALON<br>15:00 NAIL SALON<br>19:00 DATE | 18:30 WOMEN'S PARTY | 13:00 YOGA LESSON |
| | HEALTH AND BEAUTY FEELING | PHYSICAL CONDITION | BAD | BAD | SLEEPY | BAD | GOOD | GOOD | SLEEPY |
| | | MOOD | NERVOUS | NERVOUS | DEPRESSED | DEPRESSED | GOOD | DEPRESSED | DEPRESSED |
| | | HEADACHE | MODERATE | MILD | NONE | NONE | NONE | NONE | NONE |
| | | BACKACHE | SEVERE | MODERATE | NONE | NONE | NONE | NONE | NONE |
| | | STIFF SHOULDERS | SEVERE | MODERATE | NONE | NONE | NONE | NONE | NONE |
| | | JOINT PAIN | NONE | NONE | MODERATE | SEVERE | NONE | NONE | NONE |
| HEALTH AND BEAUTY CONTENT PLANNING DB (USER ID = J) | HOME CARE | LYMPHATIC MASSAGE# 2 | 21:30 REPRODUCTION SCHEDULED | 21:30 REPRODUCTION SCHEDULED | 21:30 REPRODUCTION SCHEDULED | 21:30 REPRODUCTION SCHEDULED | NO REPRODUCTION | 21:30 REPRODUCTION SCHEDULED | 21:30 REPRODUCTION SCHEDULED |
| | | STRETCHING WHILE DOING SOME OTHER THING# 3 | 22:45 REPRODUCTION SCHEDULED | 22:45 REPRODUCTION SCHEDULED | 22:45 REPRODUCTION SCHEDULED | 22:45 REPRODUCTION SCHEDULED | NO REPRODUCTION | 22:45 REPRODUCTION SCHEDULED | 22:45 REPRODUCTION SCHEDULED |
| | | MASSAGE OF FOOT TRIGGER POINTS# 2 | REPRODUCTION SCHDOULED | REPRODUCTION SCHDOULED | REPRODUCTION SCHDOULED | REPRODUCTION SCHDOULED | NO REPRODUCTION | REPRODUCTION SCHDOULED | REPRODUCTION SCHDOULED |
| | | CALISTHENICS | 06:00 REPRODUCTION SCHEDULED | 06:00 REPRODUCTION SCHEDULED | 06:00 REPRODUCITON SCHEDULED | 06:00 REPRODUCTION SCHEDULED | 06:00 REPRODUCTION SCHEDULED | 08:00 REPRODUCTION SCHEDULED | 08:00 REPRODUCTION SCHEDULED |
| | | EXERCISE# 1 | REPRODUCTION SCHEDULED | REMOVED | — | — | — | — | — |
| | | EXERCISE# 2 | — | NEW DELIVERY SCHEDULED | REPRODUCTION SCHDOULED | REPRODUCTION SCHDOULED | REPRODUCTION SCHDOULED | REPRODUCTION SCHDOULED | REPRODUCTION SCHDOULED |
| | | SUPPLEMENT# 3 | TAKEN/100% | TAKEN TARGET AMOUNT | TAKEN TARGET AMOUNT | TAKEN TARGET AMOUNT | TAKEN TARGET AMOUNT | TAKEN TARGET AMOUNT | TAKEN TARGET AMOUNT |
| | | HEALING BGM# 2 | BEING REPRODUCED | 06:00 REPRODUCTION SCHEDULED | REMOVED | — | — | — | — |
| | | HEALING BGM# 3 | — | — | 06:00 REPRODUCTION SCHEDULED | 06:00 REPRODUCTION SCHEDULED | 06:00 REPRODUCTION SCHEDULED | 06:00 REPRODUCTION SCHEDULED | 06:00 REPRODUCTION SCHEDULED |
| | HEALTH AND BEAUTY SERVICE | BEDROCK BATH# 3 | — | — | 21:35 REPRODUCTION SCHEDULED | 21:35 REPRODUCTION SCHEDULED | — | — | — |
| | | NAIL SALON# 2 | — | — | — | — | 23:35 REPRODUCTION SCHEDULED | — | — |
| | | PILATES CLASS# 1 | 21:35 REPRODUCTION SCHEDULED | 21:35 REPRODUCTION SCHEDULED | — | — | — | — | 21:35 REPRODUCTION SCHEDULED |
| | | WOMEN'S TRAVEL# 2 | — | — | 21:45 REPRODUCTION SCHEDULED | 21:45 REPRODUCTION SCHEDULED | 23:45 REPRODUCTION SCHEDULED | — | |
| | HEALTH AND BEAUTY COMMODITY | ORGANIC COSMETICS# 2 | — | — | — | — | 23:35 REPRODUCTION SCHEDULED | 21:35 REPRODUCTION SCHEDULED | — |
| | | BEAUTY DEVICE# 2 | — | — | — | — | 23:35 REPRODUCTION SCHEDULED | 21:35 REPRODUCTION SCHEDULED | — |
| | HEALTH AND BEAUTY EVENT | MOXIBUSTION LESSON# 1 | — | — | 21:36 REPRODUCTION SCHEDULED | 21:36 REPRODUCTION SCHEDULED | — | — | — |
| | | TRIAL YOGA LESSON# 4 | 21:40 REPRODUCTION SCHEDULED | 21:40 REPRODUCTION SCHEDULED | — | 21:40 REPRODUCTION SCHEDULED | — | — | — |

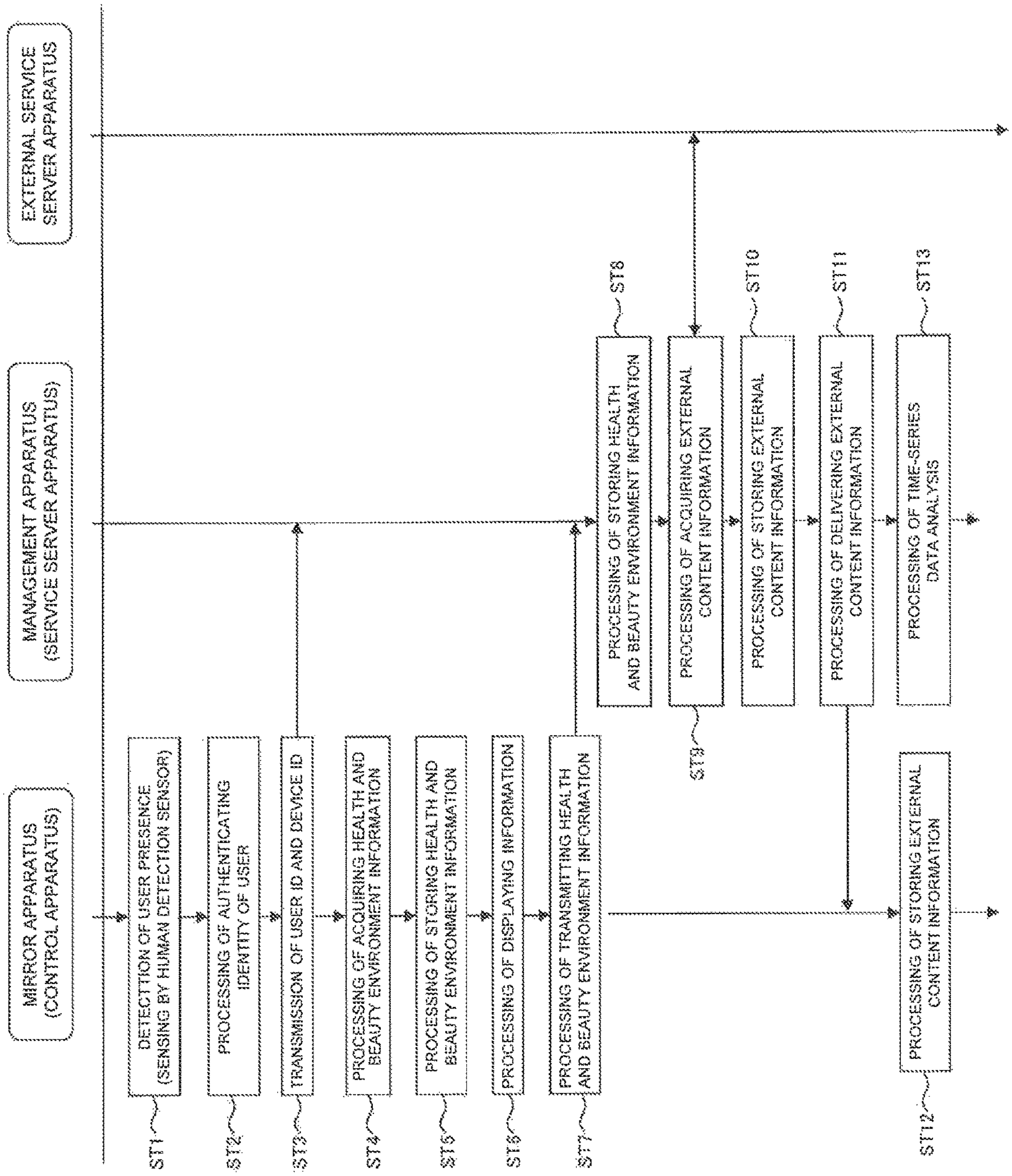
【FIG9】

【FIG10】
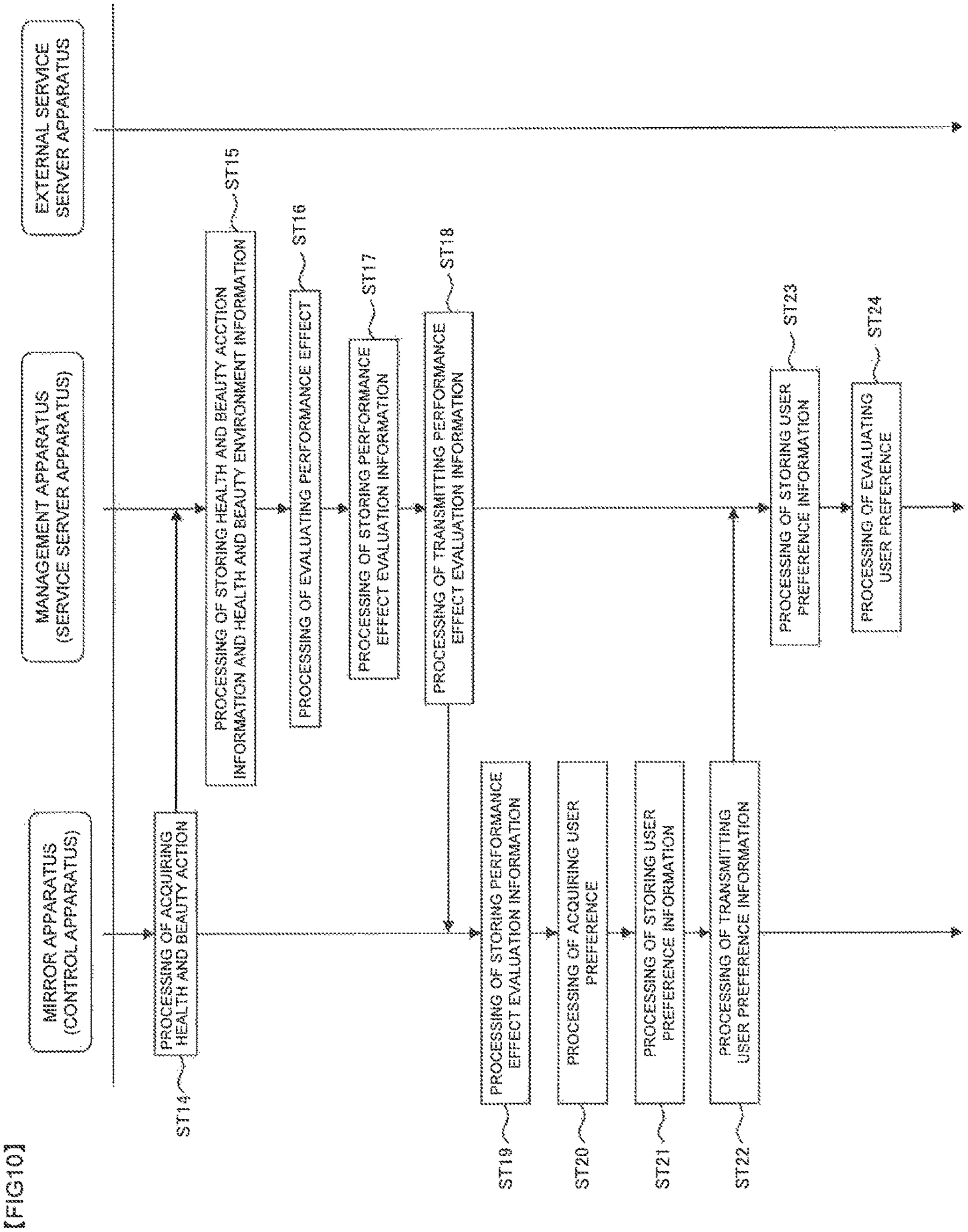

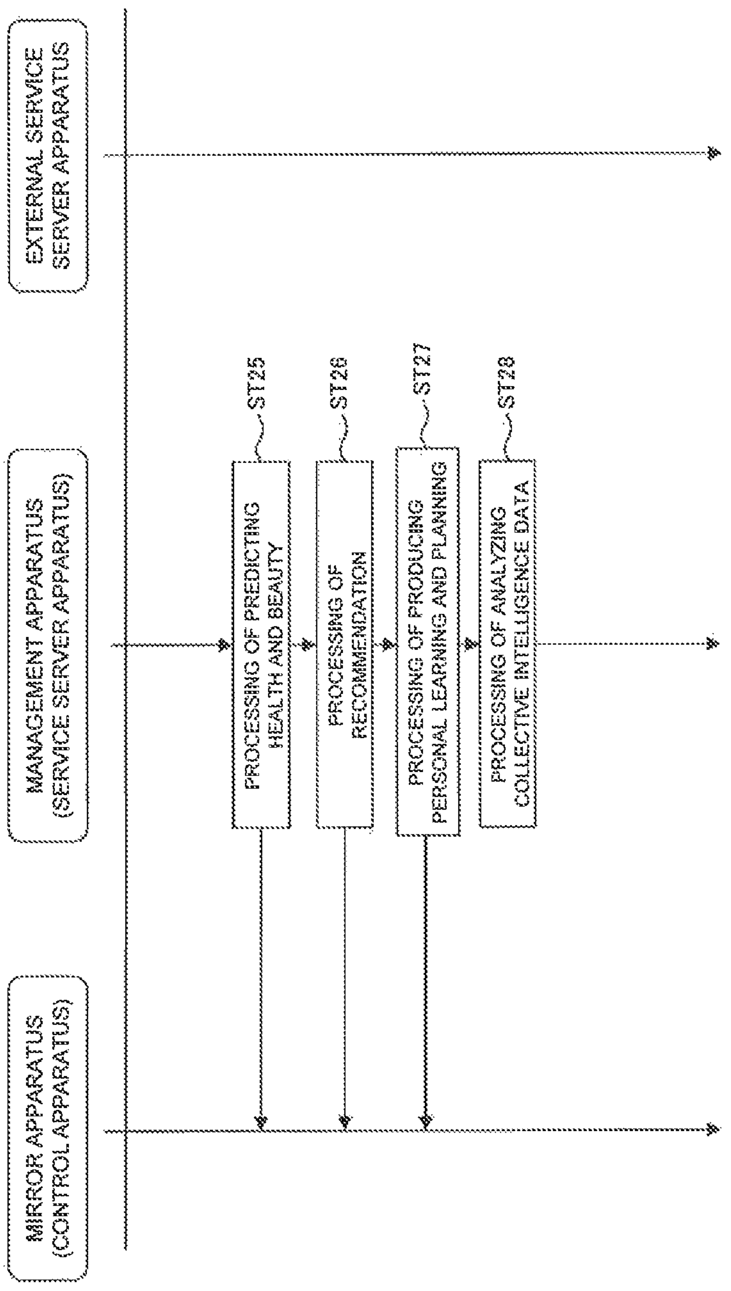
【FIG11】

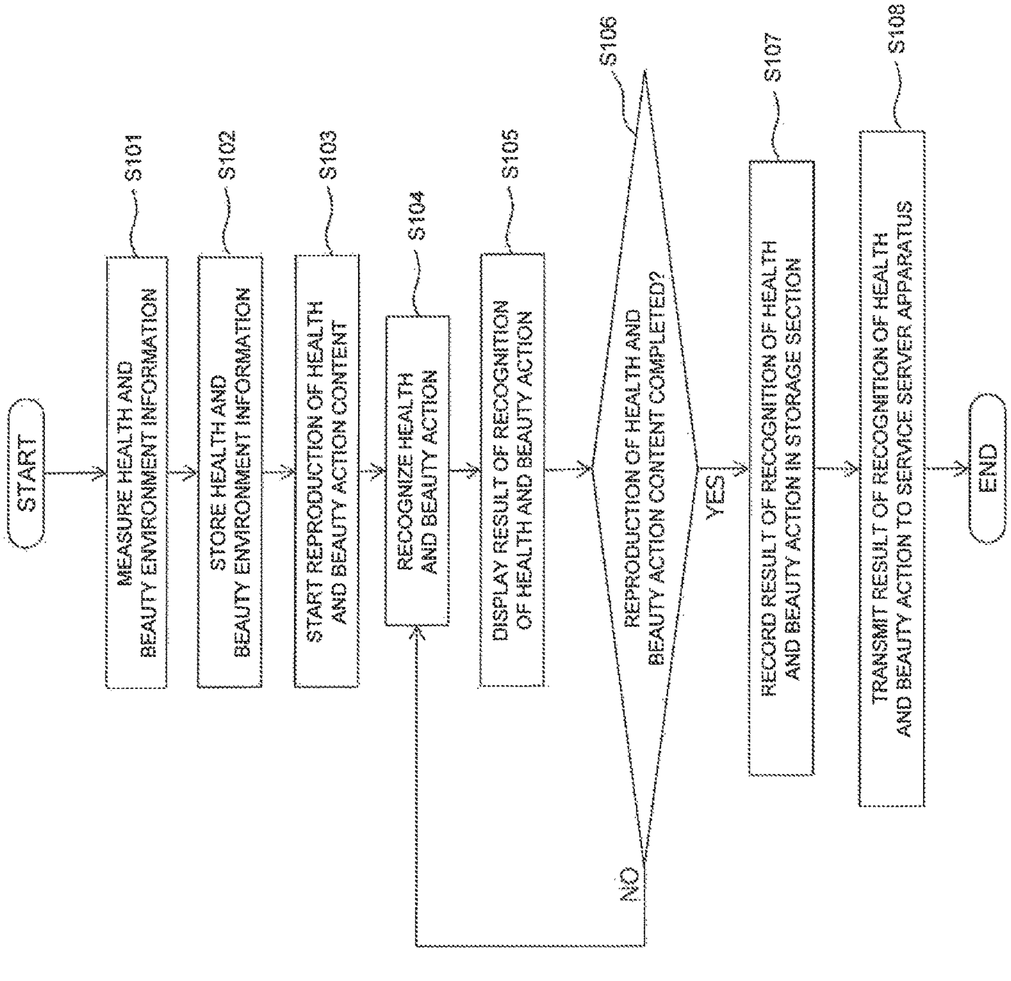
[FIG12]

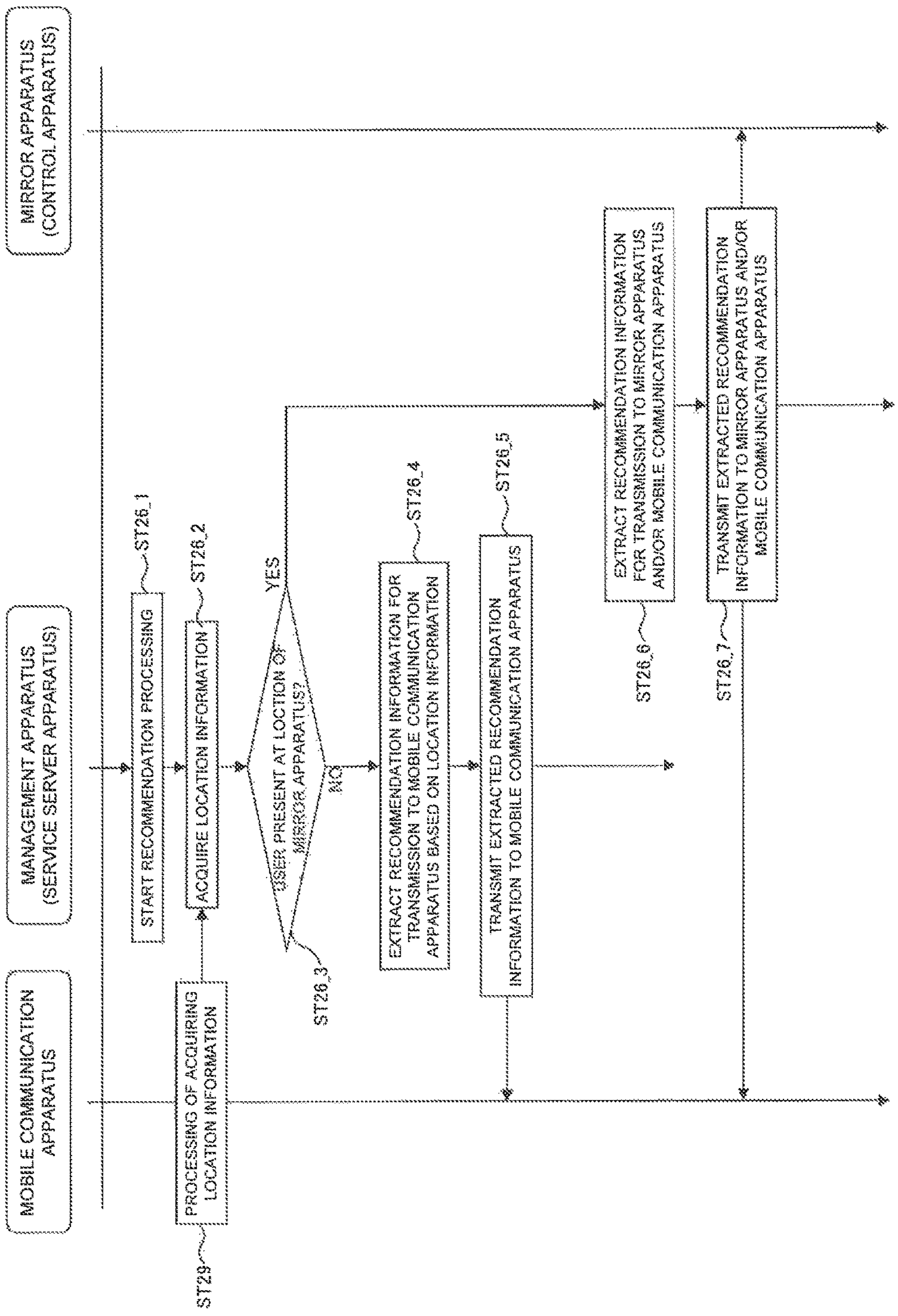
[FIG13A]

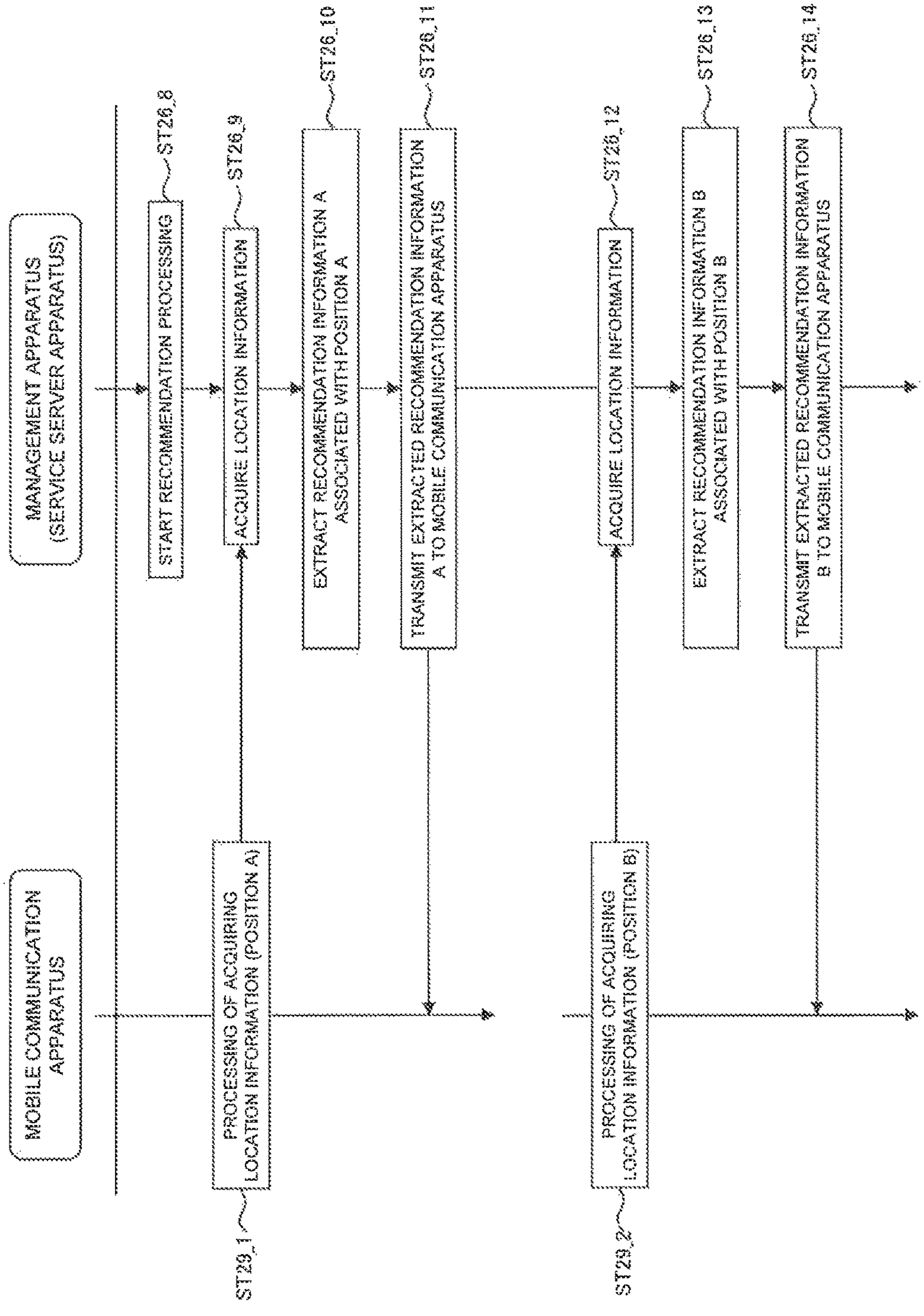
[FIG13B]

【FIG14】
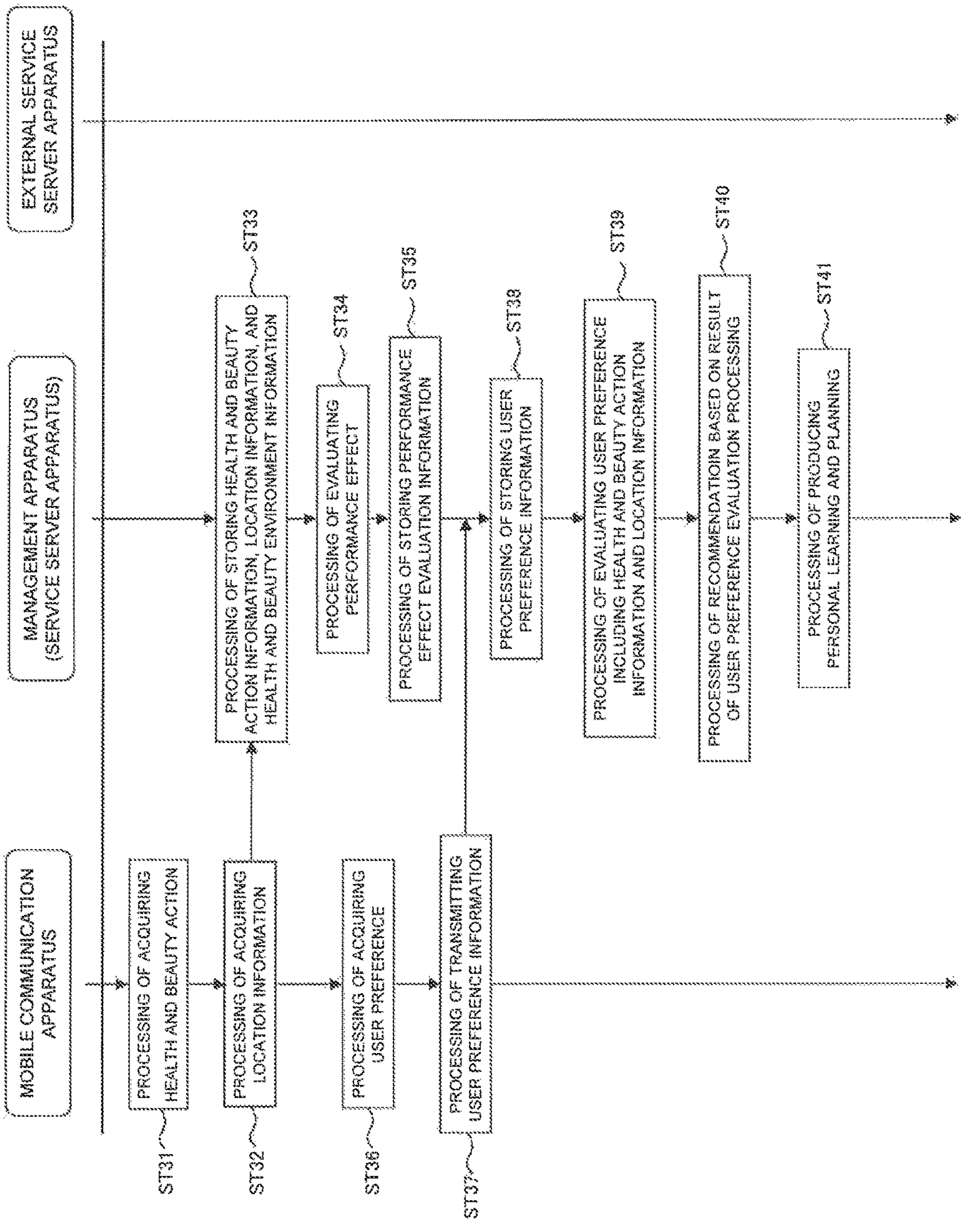

HEALTH INFORMATION SERVICE SYSTEM

TECHNICAL FIELD

Embodiments of the present invention relate to a health information service technology regarding health and beauty.

BACKGROUND ART

Mirror apparatuses are conventionally known in which information is displayed on a mirror reflecting a subject. Patent Document 1 has disclosed a mirror apparatus which can be installed in various types of facilities such as hair salons involving the use of mirrors to display a video received from a server apparatus and the appearance (mirror image) of a customer (subject) to enable comparison between them.

PRIOR ART DOCUMENT

Patent Document

[Patent Document 1] Japanese Patent Laid-Open No. 2004-357099

DISCLOSURE OF THE INVENTION

Problems to be Solved by the Invention

It is an object of the present invention to assist in improvement of health and beauty of a user based on collected health and beauty statuses of the user and statuses of actions regarding health and beauty performed by the user.

Means for Solving the Problems

A health information service system according to embodiments includes a measurement apparatus configured to measure a health and beauty status of a user, an action status acquirement apparatus configured to acquire a history of actions regarding health and beauty performed by the user, and a management apparatus connected over a network to the measurement apparatus and the action status acquirement apparatus. The management apparatus includes a storage section configured to associate health and beauty measurement information about health and beauty of the user acquired by the measurement apparatus with the history of actions and to store the health and beauty measurement information and the history of actions of the user daily in time sequence, a time-series data analysis section configured to extract a time-series pattern representing a change of the health and beauty status of the user or a time-series pattern representing no change of the health and beauty status of the user based on the time-series health and beauty measurement information in the past, and a performance effect evaluation section configured to extract the health and beauty action performed by the user when the time-series pattern is found before and after the health and beauty action of the user based on the history of actions or the health and beauty action not performed by the user when the time-series pattern is found in a nonperformance period of the health and beauty action of the user based on the history of actions and to use the health and beauty measurement information before and after the health and beauty action or the health and beauty measurement information in the nonperformance period to produce performance or nonperformance effect evaluation information about the extracted health and beauty action.

BRIEF DESCRIPTION OF THE DRAWINGS

FIG. 1 A diagram showing the system configuration and functional blocks of apparatuses of a health information service system according to an embodiment.

FIG. 2A A diagram for illustrating how to use a mirror apparatus according to the embodiment.

FIG. 2B A diagram for illustrating how to use the mirror apparatus according to the embodiment.

FIG. 3 A diagram for showing an example of display of a health and beauty action content according to the embodiment.

FIG. 4 A diagram showing functional blocks of a mobile communication apparatus according to the embodiment.

FIG. 5 A diagram showing an example of user terminal management information according to the embodiment.

FIG. 6 A diagram showing an example of health management information according to the embodiment, and showing exemplary data provided by classifying information including health and beauty environment information, external service content information, health and beauty action information, and personal preference evaluation information in time sequence.

FIG. 7 A diagram showing an example of health and beauty prediction information according to the embodiment, and showing exemplary data provided by classifying information including health and beauty environment information, external service content information, and personal preference evaluation information in time sequence.

FIG. 8 A diagram showing an example of health and beauty planning information according to the embodiment, and showing exemplary data provided by classifying information including health and beauty environment information, personal preference evaluation information, and health and beauty content planning information in time sequence.

FIG. 9 A diagram showing a processing flow in the health information service system according to the embodiment.

FIG. 10 A diagram showing a processing flow in the health information service system according to the embodiment.

FIG. 11 A diagram showing a processing flow in the health information service system according to the embodiment.

FIG. 12 A diagram showing a processing flow of acquiring an action status of a user regarding health and beauty in the health information service system according to the embodiment.

FIG. 13A A flow chart showing processing of providing recommendation information in accordance with location information of a mobile communication apparatus in the health information service system according to the embodiment.

FIG. 13B A flow chart showing processing of providing recommendation information in accordance with location information of the mobile communication apparatus in the health information service system according to the embodiment.

FIG. 14 A flow chart showing processing of associating location information of the mobile communication apparatus with a history of actions and processing of providing recommendation information based on the location information of the history of actions in the health information service system according to the embodiment.

MODE FOR CARRYING OUT THE INVENTION

A preferred embodiment of the present invention will hereinafter be described with reference to the accompanying drawings.

A health information service system according to the embodiment is a computer system which assists in improvement of health and beauty. As shown in FIG. 1, the system is configured to include a mirror apparatus 100, a control apparatus 200 for the mirror apparatus 100, and a service server apparatus 300 connected to the control apparatus 200 over a network. The service server apparatus 300 is also connected to an external service server apparatus 400 and a mobile communication apparatus 500 over networks.

The mirror apparatus 100 and the control apparatus 200 are installed, for example, in a house where a user lives, or in a facility or a shop which the user visits. The mirror apparatus 100 functions as a mirror reflecting a mirror image of the user corresponding to a subject and as a display apparatus for displaying various types of information. As described later, the mirror apparatus 100 also functions as an apparatus for acquiring health and beauty statuses and action statuses of the user present in front of the mirror apparatus 100.

As shown in FIG. 1 and FIG. 2A, the mirror apparatus 100 includes a half mirror 111 and a display panel 112. The half mirror 111 is a mirror having a reflecting film formed thereon which reflects a part of incident light and transmits another part of the incident light, and can be provided, for example by forming a thin reflecting film onto a transparent substrate made of glass or the like. The rate between the reflected light and the transmitted light can be adjusted by the thickness of the reflecting film. As shown in FIG. 2B, the half mirror 111 reflects images of the user incident on the half mirror 111 from the front side and transmits display light incident from the display panel 112 located on the rear side of the half mirror 111 toward the front side of the half mirror 111.

The display panel 112 is a display apparatus of a self-emitting type which has a display screen 113. Examples of the display panel 112 include liquid crystal display apparatuses of a back-light type or a reflective type, organic EL display apparatuses, and plasma display apparatuses. The display screen 113 of the display panel 112 can be provided over the entire half mirror 111 or in a single or a plurality of particular areas of the half mirror 111.

The mirror apparatus 100 can have any configuration, and for example, the display panel 112 may be a transparent display instead of the display apparatus of the self-emitting type. In this case, the transparent display apparatus may be formed of an organic EL device or an OLED (Organic Light-Emitting Diode), for example. The organic EL device or the OLED typically has a structure in which an organic material is sandwiched between an anode and a cathode each placed on a transparent substrate made of glass or plastic such that the organic light-emitting material emits light when an electric current is passed therethrough. Such a device has a characteristic of acting as a transparent film similar to glass during non-display periods with no electric current passed. When the display panel 112 is formed of the transparent display apparatus, a mirror which reflects all the of incident light may be placed on the rear side of the transparent display apparatus to provide the mirror apparatus 100 configured from the combination of that mirror and the transparent display apparatus without using the half mirror 111 described above.

The mirror apparatus 100 includes various devices such as a camera 120 for taking images of the user, a microphone 130, a speaker 140, a human detection sensor 150, and sensor device 160. Those devices are controlled by the control apparatus 200.

The camera 120 is provided for the mirror apparatus 100 with its imaging range covering the front side of the mirror apparatus 100. The camera 120 can take whole-body images of the user present in front of the mirror apparatus 100 or take images of a particular region such as the user's face.

The camera 120 can be provided by using a visible camera, a thermographic camera (far-infrared camera), a near-infrared camera or the like. For example, as shown in FIG. 1, two cameras 120 can be provided for the mirror apparatus 100, in which one camera 120 of them is a visible camera and the other camera 120 is a thermographic camera. When one camera can be switched between visible, far-infrared, near-infrared imaging and the like, only one camera 120 may be used. Alternatively, three or more camera 120 may be provided.

The camera 120 may be independent of the mirror apparatus 100 and mounted on the user's back, the ceiling, or a wall of the house to transmit videos taken from the back, the side, or above the user to the control apparatus 200 over a wired LAN or wireless communication. Alternatively, a hairdresser or a massager may use a wearable camera (a small camera put on his/her body to allow hands-free imaging) to transmit videos taken from the viewpoint of the service provider in real time over wireless communication or to transmit videos recorded on the camera over a wired connection or wireless communication to the control apparatus 200.

For example, it is possible to measure, from images of the user taken by the near-infrared camera, skin conditions including a skin moisture content, blood circulation, spots, makeup staying on or not, makeup deterioration, and scalp condition. It is also possible to measure a body surface temperature from thermographic images of the user taken by the far-infrared camera.

Images of the user taken by the visible camera are used to measure various types of health and beauty information of the user. For example, parts of the face such as user's eyes, nose, and mouth can be extracted from images of the face to measure distortion, sag, or swelling of the face based on coordinates, inclination, and changes over time of the respective regions. In addition, from the measured distortion or the like of the face, user's facial expression can be analyzed to measure the presence or absence or the level of a stressful condition. In addition to the face images, for example, parts of legs such as a calves and ankles can be extracted from images of the legs to measure swelling of the legs based on coordinates, inclination of the respective regions, and comparison with numerical values at usual times or from previous measurements.

From images of the whole body or images or videos of the upper body of the user taken by the visible camera, the body shape of the user can be measured. The measured body shape of the user can be matched with predetermined reference body shape data to calculate distortion of the body of the user. The camera 120 can be provided by using a monocular camera, a compound-eye camera, or a multiple camera as appropriate for taking images of the user necessary for the measurement.

The human detection sensor 150 senses the presence or absence of the user whose mirror image can be reflected in the mirror apparatus 100. The human detection sensor 150 senses movements of a person in an area on the front side of the mirror apparatus 100 with infrared rays, ultrasound, visible light or the like to detect whether the user is present in front of the mirror apparatus 100. The result of sensing the user in the human detection sensor 150 is utilized as a trigger for starting acquisition of a user action status by the mirror apparatus 100 or for starting information display to the user. The human detection sensor 150 can detect whether or not the user has moved out of the front area of the mirror apparatus 100, and the detection result can be used to control, for example, start and stop of functions.

The sensor device 160 includes a plurality of sensor devices such as a thermo-hygrometer, an illumination sensor, and a dust sensor for measuring dirt in the air. The plurality of sensor devices 160 can be concentrated at a particular point or placed at different points in the mirror apparatus 100 as appropriate.

The sensor device 160 can be configured to include the microphone 130. For example, the microphone 130 can pick up the sound of a sneeze or a cough of the user, and the number of sneezes can be acquired as information about user's health. The sensor device 160 can be configured to include a motion sensor for detecting motions of the user as well. The motion sensor may be provided by combining the infrared camera of the camera 120 with an infrared light-emitting diode.

A health and beauty measurement apparatus 170 is configured independently of the mirror apparatus 100 to be a device such as a thermometer, a weight scale, a body composition meter, a manometer, a skin diagnosis device, a breath odor meter, and a sleep meter. The health and beauty measurement apparatus 170 is connected to the control apparatus 200 and outputs detection result to the control apparatus 200.

As described above, the health information service system according to the present embodiment can acquire health and beauty environment information including health and beauty information of the user and environment information by using the camera 120, the sensor device 160, and the health and beauty measurement apparatus 170. The camera 120, the microphone 130, the human detection sensor 150, and the sensor device 160 function as a health and beauty environment sensor section of the mirror apparatus 100.

The combination of the sensor devices for measuring health and beauty statuses of the user with the sensor devices for measuring environment information is arbitrarily made. In addition, the configuration of the sensor devices in the mirror apparatus 100 is arbitrarily performed, for example such that the breath odor meter (breath odor sensor for measuring the breath odor of the user) or the skin diagnosis device is not provided as the health and beauty measurement apparatus 170 independent of the mirror apparatus 100 but is provided in the sensor device 160 integral with the mirror apparatus 100.

Next, description is made of the control of the mirror apparatus 100 and the functions of sections of the control apparatus 200. The control apparatus 200 is configured to include a communication section 211, an output control section 212, a storage section 213, a control section 220, a sensor control section 231, a measurement data analysis section 232, a user action recognition section 233, a user operation recognition section 234, an AR control section 235, and a user preference acquisition section 236.

The communication section 211 is a communication control section for communicating with the mirror apparatus 100 and with the health and beauty measurement apparatus 170 and performing communication between the control apparatus 200 and the service server apparatus 300 over the network. The communication between the control apparatus 200 and the health and beauty measurement apparatus 170 can be performed through proximity wireless communication such as Bluetooth® or NFC (Near Field Communication). Alternatively, the health and beauty measurement apparatus 170 and the control apparatus 200 may have a wired connection between them to perform communication.

The control apparatus 200 and the service server apparatus 300 are connected to each other over the network such as a LAN (Local Area Network) or the Internet whether it is a wired or wireless channel or a dedicated channel.

The output control section 212 performs display control for controlling drive of the display panel 112 to display various types of information on the display screen 113 (information output) and sound reproduction control for outputting predetermined audio data through the speaker 140 (audio output).

The storage section 213 stores user information registered with the mirror apparatus 100, theme content information associated with the user, mirror setting information, local cache information, and privacy content information.

The user information includes a user ID of a registered user, name, age, nickname, preference, biometric authentication information for confirming the identity of the user, date and time of registration, date and time of service use, frequency of service use, and avatar information. The theme content information includes screen display content data such as a theme (wallpaper image) and an icon on the display screen 113 and audio content data such as BGM and sound effects.

The mirror setting information includes device identifying information of the mirror apparatus 100, manufacture information, network information, connectable device information, and required/not-required setting information for privacy processing of the health and beauty environment information acquired from the health and beauty environment sensor section and/or health and beauty measurement apparatus 170.

The local cache information includes a history of the final screen display content and audio content used last by the user, health and beauty environment information of the user measured by the health and beauty environment sensor section and the health and beauty measurement apparatus 170, and external service content information acquired from the external service server apparatus 400 via the service server apparatus 300. Examples of the external service content information include information regarding health and beauty such as meteorological information including weather, temperature and humidity, atmospheric pressure, and rain cloud information, health forecast information associated with the meteorological information about ultraviolet rays, heatstroke, rheumatism, depressed mood, asthma, and pollen allergy, traffic information, event information, and commodity information.

The external service content information can include health and beauty action contents. The health and beauty action contents are images or videos (action support display data) for supporting user actions regarding health and beauty such as massage, stretching, gymnastics, and exercise.

The local cache information also includes personal preference evaluation information of the user acquired by the user preference acquisition section 236 described later.

The privacy content information is sensitive content information concerning user's privacy which the user does not want to transmit to the service server apparatus 300 such as images or videos taken by the visible camera used to measure health and beauty statuses.

In the present embodiment, the health and beauty environment information of the user measured by the health and beauty environment sensor section and the health and beauty measurement apparatus 170 is transmitted to the service server apparatus 300. However, the measured original data such as images or videos is not transmitted as it is to the service server apparatus 300, but is subjected to privacy processing, for example by converting the data into another data form, and the information after the privacy processing is transmitted as the health and beauty environment information of the user to the service server apparatus 300.

The privacy processing is performed by the measurement data analysis section 232 and involves, for example, quantifying information about user's health and beauty obtained from videos or images taken by the visible camera. Specifically, as described above, the privacy processing for a skin moisturizing level and skin conditions of the user is performed by first analyzing the skin conditions of the user including a skin moisture content, blood circulation, spots, makeup staying on or not, makeup deterioration, and scalp condition. Then, the analysis result is quantified as a skin moisturizing level or a skin condition score. For example, the analysis result can be quantified with respect to a predefined evaluation standard or evaluation score to calculate the skin moisturizing level or the skin condition score from the skin moisture content, blood circulation and the like obtained from the images of the user.

The privacy processing for whole-body thermographic information involves, for example, setting classification patterns of thermographic information in advance and finding and outputting a matching classification pattern as the thermographic information of the user. Examples of the classification patterns set in advance can include a pattern representing a low body surface temperature of fingers and toes and a pattern representing a low body surface temperature mainly of a lower body.

The health and beauty statuses of the user such as distortion of the whole body or body regions, sag, and swelling can be quantified. For example, parts of the face such as user's eyes, nose, and mouth can be extracted from images of the face to measure coordinates and inclination of those regions to analyze differences from reference body shape data or changes of those regions over time. Then, the analysis result is quantified by using a predefined evaluation value for distortion amount or displacement amount, and thus the degrees of face distortion, sag, and swelling can be calculated in accordance with the analysis result. In addition, the degree of facial expression (feeling) can also be evaluated from the images of the face. For example, classification patterns of images of the face representing feelings such as cheerful, stern, somber, and tight are set in advance and are matched with images of the face to output a stress condition of the user in each classification pattern.

Only the information quantified through the privacy processing in this manner can be transmitted to the service server apparatus 300, and the original videos or images can be stored as the privacy content information in the storage section 213. The privacy content information can be configured to be protected in the control apparatus 200 by a predetermined security function used as a countermeasure against information leakage such as encryption processing or storing in a special storage area provided with a tamper resistance capability.

The control section 220 is responsible for controlling the overall control apparatus 200, and specifically, controls the functions of the communication section 211 and the output control section 212 and controls input and output of data to and from the storage section 213.

The control section 220 also controls the functions of the sensor control section 231, the measurement data analysis section 232, the user action recognition section 233, the user operation recognition section 234, the AR control section 235, and the user preference acquisition section 236 in order to acquire health and beauty statuses and action statuses of the user present in front of the mirror apparatus 100.

The sensor control section 231 controls the operations of the camera 120, the human detection sensor 150, and the sensor device 160 constituting the health and beauty environment sensor section, and acquires, from those devices, images and videos taken and detection values detected by those sensors.

The measurement data analysis section 232 produces health and beauty environment information of the user from the result of measurement performed by the health and beauty environment sensor section and the health and beauty measurement apparatus 170. Specifically, as described in the above privacy processing, the measurement data analysis section 232 analyzes skin conditions of the user including a skin moisture content, blood circulation, spots, makeup staying on or not, makeup deterioration, and scalp condition based on near-infrared images or videos of the user taken by the camera 120. The measurement data analysis section 232 also extracts parts of the face such as user's eyes, nose, and mouth from visible images taken by the camera 120 to measure coordinates and inclination of those regions to analyze differences from the reference body shape data or changes of those regions over time.

The measurement data analysis section 232 can perform the privacy processing as described above by extracting the classification pattern matching the thermographic information of the user or extracting the classification pattern matching the user's facial expression (stress condition). The measurement data analysis section 232 also performs the above quantification processing on the analysis result.

The user action recognition section 233 calculates location information of each region of the whole body or the upper body of the user present in front of the mirror apparatus 100 two-dimensionally or three-dimensionally from images or videos of the user acquired by the camera 120 to recognize an action performed by the user in front of the mirror apparatus 100.

For example, the user action recognition section 233 refers to health and beauty action contents for guiding user actions such as stretching, exercise, lower body massage, and face massage to find whether the user has performed any action or not from the images or videos of the user taken by the camera 120. When the user has performed any action under the guidance of a health and beauty action content, the user action recognition section 233 can recognize, for example, that the user has massaged his/her face.

As shown in FIG. 3, the output control section 212 can acquire the health and beauty action contents in advance as the external service content information from the service server apparatus 300, and is triggered by a user operation to display any health and beauty action content on the display screen 113 of the display panel 112. The user can cause his/her mirror image to be superimposed on the displayed data of the health and beauty action content in the half mirror 111 and perform the action in synchronization with the video of the health and beauty action content.

The user action recognition section 233 calculates the location information of each region such as user's face, arm and leg, and torso in images or videos taken by the camera 120 or acquired by the motion sensor and matches the location information with the corresponding positions in the displayed data of the health and beauty action content displayed on the display screen 113. From the matching result, the user action recognition section 233 knows the user action performed in accordance with changes of the displayed data of the health and beauty action content. The health and beauty action content can include information for showing an utterance guide which prompts the user to let out his/her voice. The user action recognition section 233 can acquire utterance data of the user picked up by the microphone 130 to perform matching of the utterance timing as well as the matching of each body region.

For example, the user action recognition section 233 can express how the reproduced health and beauty action content matches the positions of moving arms and legs or the utterance rhythms in numerical form representing a matching rate. The matching rate can be displayed on the display screen 113 as the health and beauty action result after the completion of the user action such as exercise performed in accordance with the health and beauty action content or can be displayed a plurality of times at predetermined time intervals after the start of reproduction of the health and beauty action content or after the completion of part of the health and beauty action during the reproduction of the health and beauty action content.

The user action recognition section 233 can store the matching rate as an action performance history of the user. For example, the matching rate can be used to express the degree of completion of the health and beauty action content in numerical form to evaluate the action achievement of the user.

The user action recognition section 233 may use the matching rate to recognize that the user has performed the action of the health and beauty action content (such as exercise), for example when the matching rate is higher than a predetermined threshold value. Alternatively, regardless of the matching rate, the user action recognition section 233 may determine that the action achievement of the user in accordance with the health and beauty action content is made when the camera 120 or the human detection sensor 150 senses that the user is present in front of the mirror apparatus 100 for a certain time period during which the displayed data of the health and beauty content is displayed on the display screen 113.

In contrast, when the matching rate is lower than the predetermined threshold value, the user action recognition section 233 may use the matching rate to recognize that the user has not performed the action of the health and beauty action content. Alternatively, regardless of the matching rate, the user action recognition section 233 may determine that any action achievement of the user in accordance with the health and beauty action content is not made when the camera 120 or the human detection sensor 150 senses that the user is absent in front of the mirror apparatus 100 for a certain time period during which the displayed data of the health and beauty content is displayed on the display screen 113.

The user action recognition section 233 stores a history of user actions including the health and beauty action content performed by the user, health and beauty action content performed/not-performed, performance start time, performance end time, number of performances, and performance score (matching rate) in the storage section 213. The action history is transmitted to the service server apparatus 300 through the communication section 211 at an arbitrary time to store health and beauty action information in a storage section of the service server apparatus 300.

The health and beauty actions performed by the user can be configured to include actions regarding health and beauty other than exercise, such as taking supplements and listening to healing BGM. A history of supplement taking can be obtained, for example such that user's intention of making operation to indicate whether supplements are taken or not is recognized by the user operation recognition section 234, later described, and the action of taking supplements can be acquired as an action regarding health and beauty. In addition, a user action regarding health and beauty of listening to healing BGM can be acquired, for example by determining whether or not the user has reproduced music data stored in the storage section 213 or acquiring a reproduction time period.

The user operation recognition section 234 recognizes and converts user's intention of making operation with voice, gestures with arms, hands, fingers, or legs, sigh, sightline, and face direction into a predetermined operation signal and outputs the converted operation signal to the control section 220 to allow the control section 220 to control the operations of the components. For example, predetermined sounds are associated with operation signals in advance, and user's voice is picked up by the microphone. The picked up voice can be matched with the operation signals to extract a matching operation signal. In another example, a predetermined gesture, sightline, and face direction are associated with operation signals, and an image of the user image taken by the camera 120 is matched with the operation signals to extract a matching operation signal. In this manner, the user operation can be recognized by the user operation recognition section 234, and in accordance with the recognized user operation, control can be performed such as display of a particular screen on the display screen 113 of the mirror apparatus 100, control of reproduction of a content, and turn-up and turn-down of the volume.

The user operation recognition section 234 can recognize produced sounds or movements which do not show user's obvious intention of making operation such as yarn, sigh, stomach rumbling, gas, and facial expression. In this case, the user operation recognition section 234 can perform control, such that the condition of the user is found from that recognized information to perform screen display or audio output as appropriate for the found condition of the user. For example, when the sound of a sneeze is recognized, the user operation recognition section 234 may add effects by showing a display screen which represents waves causing ripples on the display screen 113 associated with the sneeze or may display a character on the display screen 113 which speaks to the user with a reproducing sound, "are you cold?"

Next, description is made of the AR control section 235. The user action recognition section 233 acquires the action status of the user who has performed the action in front of the mirror apparatus 100. The AR control section 235 shows the display data in synchronization with user movements over the image of the user reflected as the mirror image in the mirror apparatus 100.

The AR control section 235 can perform, for example, augmented reality processing of augmenting the reality in which a display content is transparently superimposed from the display panel 112 at a specified position on the mirror image of the user reflected optically in the mirror surface. The display content includes display location information indicating at which position of the mirror image the display data needs to be superimposed.

First, the user action recognition section 233 uses the result of measurement of the user present in front of the mirror apparatus 100 acquired by the health and beauty environment sensor section to calculate location information of each region of the whole body or the upper body of the user two-dimensionally or three-dimensionally. The AR control section 235 acquires the location information of each region of the user from the user action recognition section 233 to calculate display coordinates and a display size of the display content based on the location information of each region of the user. The AR control section 235 outputs the calculated display coordinates, display size, and display content to the output control section 212, and the output control section 212 displays the display content with the specified display coordinates and display size on the display screen 113. The display content for use in the augmented reality processing may include information such as display angle, distortion, color, and brightness.

The user preference acquisition section 236 collects living behaviors, a health and beauty feeling representing how the user feels the health and beauty status, and information about preference in health and beauty actions (user preference evaluation information) from the user. The user preference information can be acquired through the mirror apparatus 100.

The user preference acquisition section 236 can operate at a predetermined time. For example, the collection of the health and beauty feeling is performed at the time when the user appears in front of the mirror apparatus 100 first in the morning, and at the time when the user is detected by the mirror apparatus 100 after a predetermined time period of absence in front of the mirror apparatus 100 in the evening or later. The collection of the health and beauty action preference is performed at the time when the reproduction of a health and beauty content is completed or at the time when a health and beauty action of the user associated with a health and beauty action content is completed.

For starting the acquisition of user preference, the user preference acquisition section 236 outputs a control signal to the output control section 212 so as to display a user preference characteristic collecting content for collecting user preference characteristics, that is, a user preference acquisition screen on the display screen 113. When the user preference characteristic collecting content for collecting data about user preference is displayed by the output control section 212, the user preference acquisition section 236 acquires a response to the user preference characteristic collecting content from the user recognized by the user operation recognition section 235.

1) For a living activity record, when the mirror apparatus 100 is installed in an undressing room, the camera 120 senses that the user is taking off clothes before taking a bath and the user preference acquisition section 236 acquires the time of the sensing as a bath time. At this point, the facial expression, body color, and body surface temperature of the user at usual times taken previously by the camera 120 are compared with the facial expression, body color, and body surface temperature of the user taken by the camera 120 before the bath. When the body (face) has a reddish color, the user preference acquisition section 236 outputs a sound, “did you drink much today?” from the speaker 140 to ask the user. The user responds to the asking sound by his/her voices expressing yes or no and an amount of alcohol intake if the user drank. The response of the user is picked up by the microphone 130, the picked up response of sound is analyzed, and the user preference acquisition section 236 collects data about the presence or absence of alcohol intake and the amount of alcohol intake, if any.

2) For the health and beauty feeling, the user preference characteristic collecting content for asking the user about current physical condition, mood, any pain in body parts, and stiff shoulders is displayed on the display screen 113. The user can make answers on the physical condition, mood, any pain in body parts, and stiff shoulders by shaking his/her head (shaking his/her head up and down for Yes, and shaking his/her head from side to side for No), making other gestures with hands, fingers, or body, or making sounds. These user operations are recognized by the user operation recognition section 234, and the recognition result is output to the user preference acquisition section 236 as the response to the questions about the physical condition, mood, any pain in body parts, and stiff shoulders.

3) For the health and beauty action preference, the user preference acquisition section 236 can ask whether the user likes the currently performed health and beauty action content or not, whether it is pleasant or not, and whether the user is interested in it or not, in the same manner as in (2), and can acquire responses.

The control section 220 stores the user preference evaluation information (the result of responses to the questions to the user) acquired by the user preference acquisition section 236 as local cache information in the storage section 213. The user preference evaluation information is transmitted to the service server apparatus 300 through the communication section 211 at an arbitrary time and is stored in the storage section of the service server apparatus 300.

The user preference information may also be acquired from the mobile communication apparatus 500 carried by the user. Examples of the mobile communication apparatus 500 include a portable information terminal having a data communication function and a computing function (for example, CPU) such as a multifunctional cellular phone and PDA (Personal Digital Assistant), a notebook computer, and a tablet computer.

FIG. 4 is a diagram showing the functional blocks of the mobile communication apparatus 500. A display section 510 is a display apparatus and can include an operation input function of a touch panel or the like. A control section 530 can control display of various types of information and screens based on user input operations performed through the display section 510.

A camera 521 has a configuration similar to that of the camera 120 of the mirror apparatus 100 and is a visible camera or a near-infrared camera. A sensor device 522 has a configuration similar to that of the sensor device 160 of the mirror apparatus 100 and includes a plurality of sensor devices such as a thermo-hygrometer, an illumination sensor, a dust sensor, and an optical coherence tomographic device. The sensor device 522 may be configured to include a microphone 523.

A communication section 531 is similar to the communication section 211 of the control apparatus 200 and is a communication control section for communicating with the health and beauty measurement apparatus 170 and communicating with the service server apparatus 300 over the network. An output control section 532 performs display control for displaying various types of information on the display section 510 (information output) and sound reproduction control for outputting predetermined audio data (audio output). A location information acquisition section 533 functions as a GPS apparatus for acquiring the current position of the mobile communication apparatus 500.

The mobile communication apparatus 500 further includes a sensor control section 535 and a measurement data analysis section 536. Since the functions of those sections are identical to those of the sensor control section 231 and the measurement data analysis section 232 of the control apparatus 200, respectively, description thereof is omitted. The mobile communication apparatus 500 can use the devices such as the camera 521, the sensor device 522, and the microphone 523 to measure and acquire information other than the information acquired only by the mirror apparatus 100 such as body misalignment and thermographic patterns in the health and beauty information. In contrast to the mirror apparatus 100, the mobile communication apparatus 500 can transmit, to the service server apparatus 300, the information measured by the devices such as the camera 521, the sensor device 522, and the microphone 523 in association with location information for determining the location of the measurement acquired by the location information acquisition section 533 serving as the GPS apparatus. In this case, the measured information and the location information for determining the location of measurement can be stored in association with each other in a storage section 314 of the service server apparatus 300.

A user action recognition section 537 can be configured, for example, to display a health and beauty action content of facial lymphatic massage over a face image of the user taken by the camera 521 on the display section 510 to recognize the user action performed in synchronization with the video of the health and beauty action content, similarly to the user action recognition section 233 of the control apparatus 200. The result of the recognition of the health and beauty action can be stored in association with location information about the location of the performance of the health and beauty action acquired by the location information acquisition section 533 serving as the GPS apparatus.

The user action recognition section 537 calculates location information of each region of use's face, arms and hands in images or videos taken by the camera 521 and matches the location information with the corresponding positions in the displayed data of the health and beauty action content displayed on the display section 510. From the matching result, the user action recognition section 537 can know the user action performed in accordance with changes of the displayed data of the health and beauty action content.

The mobile communication apparatus 500 includes a user preference acquisition section 538 having the function similar to that of the user preference acquisition section 236 and functioning to collect user preference information at a predetermined time. For example, the current position is found by the location information acquisition section 533, and the time when the user returns home can be acquired as a go-home time in health and beauty action preference information. In addition, from the location information recorded in association with the performance of a health and beauty action, the user preference acquisition section 538 can recognize the location where the user performs the health and beauty action (for example, in his/her company, on the move during commute, in a park, and any other facility) and can set that location as information indicating the preference of the user in performing the health and beauty action (the preferred location of performance).

The user preference acquisition section 538 can collect, as a get-up time, data about the time when the user turns off a ringing alarm clock set for morning wake-up in the mobile communication apparatus 500. In another example, the mobile communication apparatus 500 can be configured to receive the result of morning measurement with the thermometer (health and beauty measurement apparatus 170) and collect data about the time of the reception of the morning temperature measurement result from the thermometer as the get-up time.

The mobile communication apparatus 500 can be configured to receive the result of measurement with the sleep meter (health and beauty measurement apparatus 170) and acquire a fall-asleep time, a wake-up time, or a get-up time, as the user preference information.

The camera 521 of the mobile communication apparatus 500 can take images of breakfast, lunch, and dinner, the calorie intake of each meal can be calculated with a calorie calculation application installed in advance on the mobile communication apparatus 500, and the resulting information can be acquired as the user preference information. The calorie calculation can also be performed, for example by connecting to a site where a calorie calculation application is provided, transmitting the taken images of menus thereto from the mobile communication apparatus 500, and then receiving the calorie calculation result therefrom. Alternatively, the user may input caloric values to the mobile communication apparatus 500 without taking images of menus.

The user preference information acquired by the user preference acquisition section 538 of the mobile communication apparatus 500 is stored in a storage section 534 and is transmitted to the service server apparatus 300 through the communication section 531 for storage as the user preference evaluation information in the storage section of the service server apparatus 300. The location information at the time of the acquisition of the user preference may also be transmitted to the service server apparatus 300 and stored as user preference evaluation information in association with the location information in the storage section 314 of the service server apparatus 300.

Next, description is made of the service server apparatus 300 in detail. The service server apparatus 300 is configured to include a communication section 311, an external content acquisition section 312, an output control section 313, the storage section 314, a control section 320, a time-series data analysis section 331, a performance effect evaluation section 332, a user preference evaluation section 333, a health and beauty prediction section 334, a recommendation section 335, a personal learning and planning section 336, and a collective intelligence data analysis section 337.

The communication section 311 is a communication control section for communicating with the control apparatus 200 and with the mobile communication apparatus 500 over the network. The external content acquisition section 312 acquires various types of external contents described above from the external service server 400 over the network.

The storage section 314 stores user information, user terminal management information, health management information, health and beauty prediction information, and health and beauty planning information (personal study planning information). The user information is identical to the user information stored in the control apparatus 200 of each mirror apparatus 100 and is personal information of the user described above. The user terminal management information is information indicating the relationship between the user ID and device types and device IDs for identifying the mirror apparatus 100 and the mobile communication apparatus 500. The user terminal management information can be configured to include the device type and the device ID of the mobile communication apparatus 500.

FIG. 5 is a diagram showing an example of the user terminal management information. A single user can have a plurality of devices, or two users can share the same mirror apparatus 100. The mirror apparatus 100 can be configured to have a plurality of types with different sizes from a mirror (large) for reflecting the user's whole body, a mirror (medium) for reflecting the upper body, to a mirror (small) mountable on a table for mainly reflecting the face, different mirror image ranges, different acquirable health and beauty environment information, different reproducible health and beauty contents, and different recognizable health and beauty actions. For each of the large, medium, and small mirror apparatuses 100, the size of the mounted display screen 113, the sensor device 160, the camera 120, the speaker 140, and the human detection sensor 150 are provided as appropriate for the size and configuration of the mirror apparatus 100 on which they are mounted. The user and the mobile communication apparatus 500 may have a one-to-one relationship, or a plurality of users may share the mobile communication apparatus 500.

FIG. 6 is a diagram showing an example of the health management information. The health management information is stored for each user and can be configured as data provided by organizing health and beauty environment information, external service content information, health and beauty action information, and personal preference evaluation information in time sequence as shown in FIG. 6.

The health and beauty environment information includes health and beauty information such as basal body temperature, menstrual cycle, weight, degree of body misalignment, degree of face sag, degree of face swelling, skin moisturizing level, skin condition score, thermographic pattern, sleep quality, degree of leg swelling, level of breath odor, facial expression, and number of sneezes, and environment information including indoor temperature and indoor humidity.

Each of the health and beauty information and the environment information is the results of measurement in the devices acquired through the mirror apparatus 100 and the information processed on the basis of the measurement results in the control apparatus 200. Since the information is described above, description thereof is omitted.

The external service content information is information about health and beauty such as meteorological information including weather, temperature and humidity, atmospheric pressure, and rain cloud information, health forecast information associated with the meteorological information about ultraviolet rays, heatstroke, rheumatism, depressed mood, asthma, and pollen allergy, traffic information, event information, and commodity information, and is obtained from the external service server apparatus 400 of the service system.

The health and beauty action information is information indicating a history of performed health and beauty actions for improvement, maintenance, and healing in health and beauty of user's mind and body such as massage, stretching, exercise, and music listening, and corresponds to a history of user actions performed in accordance with health and beauty action contents described above.

The personal preference evaluation information includes a living activity record including get-up time, bedtime, times and calorie intakes of breakfast, lunch, and dinner, go-home time and bath time, and amount of alcohol intake, the health and beauty feeling acquired from the user including physical condition, mood, headache, backache, stiff shoulders, and condition and degree of joint pain, and health and beauty action preference including the statuses of performance of health and beauty actions and user's liking for or the user being good or bad at each health and beauty action acquired from the user. The health and beauty action preference can be configured to include preference information such as taking supplements or listening to healing BGM. The personal preference evaluation information corresponds to the personal preference information acquired by the user preference acquisition sections 236 and 538.

The time-series data analysis section 331 analyzes the health and beauty information of the user acquired in a time sequence to produce a pattern of health and beauty or a pattern of health and beauty status changes (time-series pattern) for the user. The time-series data analysis section 331 can perform the time-series data analysis processing at an arbitrary time once the health information has been accumulated in the storage section 314 over a certain time period necessary for the time-series data analysis. The result of the time-series data analysis processing is stored in the storage section 314. The time-series data analysis processing may be performed by using the result of the preceding time-series data analysis.

By way of example, assuming that thermographic images are subjected to the time-series data analysis, patterns of thermographic images taken at substantially the same time of day before taking a bath and data of indoor temperature can be used to see changes in body surface temperature over time and a tendency of the changes is analyzed. From the thermographic image, a coldness classification type such as "coldness of fingers and toes" and "coldness of lower body" or a coldness level (high, medium, or low) can be known as described above, so that the relationship between daily changes of the type and factors can be analyzed.

For example, the relationship between meteorological information such as weather or atmospheric pressure and coldness classification type, or the relationship between sleep quality and coldness classification type is analyzed in time sequence. The analysis can create the analysis result in which the cold lower body is found in bad weather and low sleep quality leads to a "high" coldness level.

When an "ovulation day" comes in the menstrual cycle, the backache turns into a "high" or "medium." level. When the dispersing pollen count exceeds $50/m^3$, the number of sneezes exceeds 20. When the amount of alcohol intake is "large" and the bedtime is "after 12 o'clock," the produced analysis result can be that there are tendencies of the degree of face swelling to be "5 or higher," the degree of leg swelling to be "5 or higher," the get-up time to be "after 8 o'clock," and the user "not to perform" a health and beauty action scheduled in the morning (for example, calisthenics). When it is "cloudy" or "rainy," a tendency of a joint pain to turn into a "medium" or "strong" level can be produced as the analysis result.

The time-series data analysis section 331 can use health and beauty information of the user acquired in time sequence to produce the time-series pattern of health and beauty status changes of the user described above and to produce a time-series pattern of health and beauty statuses of the user which have not been changed. For example, from the thermographic images, the time-series data analysis section 331 can produce a time-series pattern of health and beauty statuses of the user which represent no changes in coldness level from "high coldness of lower body" to "high coldness of lower body."

The performance effect evaluation section 332 analyzes a change before and after a health and beauty action to perform performance effect evaluation processing for evaluating the health and beauty action performed by the user. For example, the performance effect evaluation section 332 finds a change in numerical value of health and beauty information before and after a health and beauty action, a change in coldness classification type of thermographic images, for example from "coldness of fingers and toes" to "coldness of lower body," or a change in coldness level, for example from "high coldness of lower body" to "low coldness of lower body."

The performance effect evaluation section 332 can perform the performance effect evaluation processing on health information acquired over a predetermined time period within a time period such as a week or a month during which the health and beauty action is continued, or can perform the performance effect evaluation processing on health information acquired over a time period from the start date of the health and beauty action to the present time.

After finding such a change, the performance effect evaluation section 332 evaluates the degree of the change. For example, when the coldness classification type changes from "high coldness of lower body" to "low coldness of lower body," the performance effect evaluation section 332 can make an evaluation to determine that the health and beauty action performed by the user had a performance effect and was a factor in changing the health and beauty status of the user. Similarly, when the degree of face swelling changes to a lower level or the weight is reduced, the performance effect evaluation section 332 can make an evaluation to determine that a performance effect was created.

The evaluation can be performed by setting an evaluation standard in advance and determining "performance effect created" when the evaluation standard is met. In addition, evaluation standards can be finely set to add performance effect levels such that "performance effect created (small)" is determined when a change in numerical value is 5% and "performance effect created (large)" is determined when a change in numerical value is 10% or higher.

In contrast, when the coldness classification type changes from "low coldness of lower body" to "high coldness of lower body," the performance effect evaluation section 332 can make an evaluation to determine that the health and beauty action of the user has no performance effect. Similarly, when the degree of face swelling changes to a higher level or the weight is increased, the performance effect evaluation section 332 can make an evaluation to determine that no performance effect is created, and can also add levels of no performance effect depending on the degree of the change.

The performance effect evaluation processing may be performed by taking account of the history of performed health and beauty actions in connection with the degree of changes of health and beauty information. For example, the action records of health and beauty actions including continuous performance time, number of performances, and performance score can be used to evaluate the level (high, medium, or low) of performance effect created/performance effect not created. The action records can include a case where the user has not performed the health and beauty action. In addition, collective intelligence analysis information, described later, can be used and compared with average changes in numerical value of health and beauty in a group of users of the same age to evaluate the level (high, medium, or low) of performance effect created/performance effect not created.

The performance effect evaluation section 332 can evaluate not only the performed health and beauty actions but also the effect provided by not performing a scheduled health and beauty action. For example, the performance effect evaluation section 332 evaluates the degree of influence of an unperformed health and beauty action based on changes in numerical value of health and beauty information such as skin condition score, weight, and body fat during a time period (nonperformance period) in which exercise or massage scheduled as a health and beauty action is not performed. Thus, the history of user actions acquired as health and beauty actions includes the record of nonperformance of the health and beauty action content, and the user action recognition section 233 can recognize that the user has not performed the action in accordance with the scheduled health and beauty action content.

For example, when a health and beauty action content is not reproduced, when a user action performed in accordance with changes of displayed data of a health and beauty action content cannot be found over a predetermined time period or longer during reproduction of the health and beauty action content, or when the absence of the user is sensed by the human detection sensor 150 over a predetermined time period or longer during reproduction of a health and beauty action content, the user action recognition section 233 can recognize that the user has not performed that health and beauty action content.

The performance effect evaluation section 323 extracts a nonperformance period of predetermined days or longer during which the user has not performed a health and beauty action from the storage section 314 and founds in the extracted nonperformance period, for example, a pattern indicating a change from "low coldness of lower body" to "high coldness of lower body" extracted by the time-series data analysis section 331. The performance effect evaluation section 323 can extract the health and beauty action not performed by the user when the pattern of the change is found during the nonperformance period of the health and beauty action and can use each health and beauty measurement information in the nonperformance period, for example, each health and beauty measurement information at the start and end of the nonperformance period to produce nonperformance effect evaluation information of the extracted health and beauty action. In this manner, the performance effect evaluation section 323 can produce the evaluation information from the evaluation of the effect, change, and outcome caused by the nonperformance of the health and beauty action such as worsening of coldness from "low coldness of lower body" to "high coldness of lower body" as a result of nonperformance of the predetermined health and beauty action.

When an obvious change is found in the numerical value, image, or pattern of health and beauty information other than the health and beauty information on which a performed health and beauty action is assumed to act, that change can be evaluated as a performance effect. For example, health and beauty massage assumed to have a coldness removing effect may cause changes in health and beauty status of the user such as metabolism speed-up, increased skin condition score, improved sleep quality, and increased number of "cheerful" facial expressions, and those changes are evaluated as a secondary health and beauty action effect.

The performance effect evaluation section 332 of the present embodiment can evaluate the performance effect of a health and beauty action based on a pattern representing no change of the health and beauty status of the user as well as a pattern representing a change of the health and beauty status of the user. For example, in a time-series pattern of the health and beauty status of the user representing no change in coldness such as from "high coldness of lower body" to "high coldness of lower body," the performance effect evaluation section 332 extracts a health and beauty action producing no change in health and beauty status or a health and beauty action not performed by the user during the nonperformance period of the health and beauty action. The performance effect evaluation section 332 can use each health and beauty measurement information before and after the health and beauty action or each health and beauty measurement information during the nonperformance period to produce nonperformance effect evaluation information of the extracted health and beauty action. Since "high coldness of lower body" does not change, the performance effect evaluation section 332 can make an evaluation to determine that a predetermined health and beauty action performed by the user has no performance effect or that nonperformance of a predetermined health and beauty action is a factor in the unchanged health and beauty status.

The user preference evaluation section 333 performs user preference evaluation processing of evaluating personal preference of the user based on each information such as the living activity record, action planning, health and beauty feeling, and health and beauty action preference of the user at an arbitrary time.

For example, the user preference evaluation section 333 can estimate a life rhythm pattern such as "active in morning," "active in night," or "irregular," based on a gate-up time and a bedtime within a predetermined time period in the living activity record. The classification patterns "active in morning," "active in night," and "irregular" can be associated with predetermined get-up times and bedtimes in advance, and the user preference evaluation section 333 can refer to average values of get-up times and bedtimes of the user in the predetermined time period to determine which classification pattern they match, thereby estimating the life rhythm pattern of the user.

In addition, the user preference evaluation section 333 can know the tendency of the user to get up after 9 o'clock and not to perform a health and beauty action in the next morning of the alcohol intake of a "medium" or "large" amount. In this case, the user preference evaluation section 333 can extract, for example, time-series data associated with the "medium" or "large" amount of alcohol intake and extract a get-up time and a history of health and beauty actions from time-series data of the day after the date of the extracted time-series data to find user activity situations such as the get-up time and health and beauty action on the next day in relation to the amount of alcohol intake.

Based on the health and beauty action preference, the tendency of the user to be good or bad at can be found for each of a plurality of health and beauty actions. For example, the user preference evaluation section 333 can use the health and beauty action preference and the action history of the health and beauty action information to find that massage, stretching, and calisthenics are "pleasant" and "performed every day" when the user performs those health and beauty actions a predetermined number of times or more and feels "pleasant" as the action preference. The user preference evaluation section 333 can also determine the tendency of the user to be "bad at" exercise in general and not want to continue.

The health and beauty prediction section 334 predicts health and beauty information of the health and beauty environment information and health and beauty feeling information of the personal preference evaluation information from a predicted menstrual cycle in the health and beauty information of the health and beauty environment information, meteorological forecast of the external service content information periodically acquired from the external service server apparatus 400, and action planning of the personal preference evaluation information. From the predicted health and beauty information of the health and beauty environment information, another health and beauty information may also be predicted. FIG. 7 shows an example of the health and beauty prediction information, and health and beauty prediction processing can be performed as described below.

1) From meteorological forecast of weather and atmospheric temperature in the external service content information, a thermographic pattern of the health and beauty information and a health and beauty feeling of the personal preference evaluation information are predicted. Specifically, from a group of past time-series data of health management information, the health and beauty prediction section 334 can previously specify health management information with a thermographic pattern of "high coldness of lower body" and a joint pain of the health and beauty feeling of "intense" and know that the weather of meteorological information was "rainy" and the atmospheric temperature was "10° C. or lower" at the time when that health management information was produced. Thus, for example when a meteorological forecast three days from now shows that the weather is "rainy" and the atmospheric temperature is "10° C. or lower," the health and beauty prediction section 334 can produce health and beauty prediction information three days from now including a thermographic pattern of "warning against coldness of lower body" and a joint pain of the health and beauty feeling of "intense."

Similarly, when a meteorological forecast for the day after tomorrow shows that the weather is "cloudy" and the atmospheric temperature is "lower than 14° C.," the health and beauty prediction section 334 can produce health and beauty prediction information for the day after tomorrow including a thermographic pattern indicating "caution against coldness of lower body" and a joint pain of the health and beauty feeling of "medium." When the above meteorological conditions are not met, for example in a weather forecast for tomorrow, the health and beauty prediction section 334 can produce health and beauty prediction information for tomorrow including a thermographic pattern indicating "warry-free" and a joint pain of the sense of health and beauty feeling of "none."

2) Based on a meteorological forecast of dispersing pollen count in the external service content information, the health and beauty prediction section 334 can produce health and beauty prediction information including a sneeze prediction of the health and beauty information of "worry-free" when the dispersing pollen count is lower than $50/m^3$, "caution" when the dispersing pollen count ranges from $50/m^3$ to $250/m^3$, and "warning" when the dispersing pollen count is $250/m^3$ or higher. Similarly to the above case, from a group of past time-series data of health management information, the health and beauty prediction section 334 can find the relationship between the number of sneezes and the past dispersing pollen count and set the dispersing pollen counts associated with "worry-free," "caution," and "warning" in advance.

3) The health and beauty information can be predicted from the action planning of the personal preference evaluation information to produce health and beauty prediction information in which the degree of face swelling is changed to "warning" and the level of breath odor is changed to "warning" for the day after a women's party in a schedule.

4) When the degree of face swelling of the health and beauty environment information is "warning" and the skin moisturizing level is "caution" or "warning," health and beauty prediction information can be produced with a skin condition score of "warning." When the degree of face swelling is "caution" and the skin moisturizing level is "caution," health and beauty prediction information can be produced with the skin condition score changed to "caution." As described above, health and beauty information on the day after a women's party can be found from a group of past time-series data of health management information, so that health and beauty prediction information five days after the women's party can be produced as described above.

The recommendation section 335 combines the result of time-series data analysis in the time-series data analysis section 331, the result of performance effect evaluation of health and beauty actions in the performance effect evaluation section 332, the result of user preference characteristic evaluation in the user preference evaluation section 333, the result of prediction of health and beauty status and health and beauty feeling in the health and beauty prediction section 334, and the result of collective intelligence analysis in the collective intelligence data analysis section 337 to calculate information for recommending selection, performance, and introduction timing of health and beauty actions, health and beauty commodities, and health and beauty services appropriate for each user, and records the recommendation information in the storage section 314.

1) When the recorded result of preference of a health and beauty action content shows that the user is "bad at" the content in the health and beauty action preference information, the recommendation section 335 can switch that content to a different health and beauty service content of the same type. For example, when the user is bad at "exercise #1," this is switched to an easier content "exercise #2." When the record shows that the use is "bad at" a predetermined number or more of different exercise contents, it can be determined that the user is "bad at" exercise in general, and the maximum number of reproduced contents per day can be set at "one at most."

2) The recommendation section 335 searches collective intelligence analysis information about a thermographic pattern indicating "type of coldness of lower body" of users for a ranking of health and beauty actions with high performance rates in a group of users belonging to the pattern on each date or within a predetermined time period or a ranking of health and beauty actions with high counts for each personal preference such as "pleasant", "preference", or "good at," excludes actions which many of the users are "bad at" or did not perform in the health and beauty action preference, and health and beauty actions, commodities, services, or exercise types having small effects in the result of performance effect evaluation, and selects a health and beauty action determined to have a high performance effect as a health and beauty content which is a candidate for deliver to the user at the time of start of "follicular phase" in health and beauty prediction.

3) When the user has a living behavior pattern of "active in morning" and frequently performs health and beauty actions after getting up in the morning, the recommendation section 335 can select a health and beauty content relating to a health and beauty action, commodity, service, or health and beauty event desirable in the morning. From the relationship with performance locations (location information) of health and beauty actions included in preference information of the user, the recommendation section 335 can select a health and beauty content which can be performed at a location preferred by the user.

4) When an update is performed in a health and beauty action, commodity, or service, or in a status of holding or participation of a health and beauty event by a user serving as the user's model, the recommendation section 335 can select the update as information which should be transmitted to the mirror apparatus 100 or the mobile communication apparatus 500 accessed by the user first after the update.

The health and beauty contents may be limited depending on the type of device owned by the user and recorded in the user terminal management information in the storage section 314. For example, each health and beauty content has a type of device stored therein which is recommended for reproduction. A content involving whole-body exercise or massage may be selected as a recommendation to a user who has the device of the type "mirror apparatus (large)" and may not be selected for a user who does not have such a device. When a content regarding a health and beauty action, commodity, health and beauty event is displayed in an area or at a point based on the location information of the mobile communication apparatus 500, the recommendation section 335 may be configured not to select that content for a user who has no registration of the mobile communication apparatus.

The personal learning and planning section 336 can use the information for recommending selection, performance, and introduction timing of health and beauty actions, health and beauty commodities, and health and beauty services appropriate for each user calculated in the recommendation section to produce a plan to deliver and reproduce a health and beauty service content for transmission to a predetermined user and can record the plan in the storage section 314. FIG. 8 is a diagram showing an example of health and beauty planning information, and personal study planning processing can be performed as described below.

1) When the personal preference evaluation information includes a today's physical condition and a tomorrow's physical condition prediction of "poor," a health and beauty service of "Pilates class #1" and a health and beauty event of "trial yoga lesson #4" are set to reproduction or reproduction scheduled.

2) At the time when the menstrual cycle of health and beauty environment information changes from "menstrual phase" to "follicular phase," then "healing BGM #3" is recorded in health and beauty content planning information, and a schedule of healing BGM reproduction is set to "healing BGM #3" from "healing BGM #2."

3) After the user takes a bath with a thermographic pattern prediction of health and beauty environment information of "caution against coldness of lower body" or "warning against coldness of lower body," a health and beauty service of "bedrock bath #3" and a health and beauty event of "moxibustion lesson #1" are set to reproduction scheduled.

4) After the user takes a bath on the day when an action planning of personal preference evaluation information includes "dating," a health and beauty service of "nail salon #2," and health and beauty commodities of "organic cosmetics #2" and "beauty device #2" are set to reproduction scheduled.

5) After the user takes a bath (3/26) three days before the day (3/29) when an action planning of personal preference evaluation information includes "women's party," a health and beauty service of "women's travel #2" is set to reproduction scheduled.

The collective intelligence analysis information is information obtained from analysis of overall health information of a plurality of users and is provided by extracting average movements or change patterns of time-series data on each date or within a predetermined time period from health and beauty information of health and beauty environment information, histories of living behaviors, and health and beauty feelings of personal preference information for each user group satisfying a predetermined condition.

For example, the collective intelligence data can be produced by using, as a key, meteorological information of external service content information, environment information of health and beauty environment information, and health and beauty action information. The predetermined condition is the sex, age, and date of time-series data, and they can be set as attributes of user groups. The attributes of the user groups may be set on the basis of classification types, classification patterns, or numerical values of data items included in health information.

The collective intelligence data analysis section 337 first extracts a user group satisfying the predetermined condition, and then uses the time-series data of each health information of the extracted user group to produce, as collective intelligence analysis information, numerical value information such as average, highest value, and lowest value of health and beauty environment information, health and beauty action information, and personal preference information for each day, and characteristic information such as average movements and change patterns of numerical values within a predetermined time period.

Specifically, 1) the collective intelligence data analysis section 337 calculates numerical data such as average value, maximum value, minimum value, and variance value for each age of women and on each day in each data item of health and beauty information of health and beauty environment information or calculates an aggregated value of patterns of the menstrual cycle, thermographic pattern, and facial expression.

2) The collective intelligence data analysis section 337 can calculate a percentage or an average value for each time zone for each age of women and on each date or for each age and within a predetermined time period, in each data item of the living activity record in personal preference information. For example, the collective intelligence data analysis section 337 can calculate an average value or a percentage in each time zone of get-up times for each age, or the number of alcohol intakes within a predetermined time period.

3) The collective intelligence data analysis section 337 can calculate a ranking of health and beauty actions with high performance rates on each date or within a predetermined time period in each of user groups classified by health and beauty type such as "coldness of fingers and toes" or "coldness of lower body," or a ranking of health and beauty actions with high counts for each personal preference information such as "pleasant," "preference," or "good at."

The collective intelligence data analysis section 337 can produce collective intelligence data by using, as a key, meteorological information of external service content information, indoor environment information of health and beauty environment information, or health and beauty action of health and beauty action information. For example, the following numerical values or characteristics can be produced.

1) The collective intelligence data analysis section 337 can calculate an average or an aggregated value of the same patterns of skin moisturizing level for each age, skin condition score, thermographic pattern, and sleep quality in an indoor humidity of 5% increments in indoor environment information of health and beauty environment information.

2) The collective intelligence data analysis section 337 can aggregate an average value of health and beauty information, and patterns of menstrual cycle, thermographic pattern, and facial expression calculated for each age of women in years, months, and weeks for each weather such as "sunny," "cloudy," and "rainy."

3) The collective intelligence data analysis section 337 can calculate an average value of performances or nonperformances of a health and beauty action, maximum value and minimum value of numbers of performances, and average value, maximum value, and minimum value of amounts of performance of a health and beauty action for each age of women in years, months, and weeks for each health and beauty action of health and beauty action information.

4) In the 3) described above, for each health and beauty action of health and beauty action information, the collective intelligence data analysis section 337 can create an average of changes in numerical value of health and beauty information of health and beauty environment information, pattern of the changes in numerical value, and changes in facial expression and thermographic pattern in accordance with the performance or nonperformance and the performance amount of a health and beauty action for each age of women in years, months, and weeks.

FIGS. 9 to 11 are diagrams showing processing flows in the health information service system according to the present embodiment.

Upon sensing the presence of a user in front of the mirror apparatus 100, the human detection sensor 150 of the mirror apparatus 100 transmits user presence sensing information to the control section 220 of the control apparatus 200. After the transmission of the user presence sensing information, the human detection sensor 150 senses the presence or absence of the user at regular time intervals, and transmits user absence sensing information to the control section 220 when the user is absent (ST1).

Upon reception of the user presence sensing information from the human detection sensor 150, the control section 220 authenticates the identity of the user present in front of the mirror apparatus 100 (ST2). The authentication of the identity can be performed, for example, by biometric authentication such as face image recognition, vein authentication, iris authentication, and voiceprint authentication. In addition to the biometric authentication, authentication information may be used such as a password which can be associated with a user ID identifiable by the mirror apparatus 100 or the service server apparatus 300. When the authentication result is OK, the control section 220 transmits a user ID and a device ID of the mirror apparatus 100 as well as the authentication result to the service server apparatus 300 (ST3). When the user and the mirror apparatus 100 have a one-to-one relationship such as when a resident is alone in a living space, the human detection sensor 150 detects the presence of a user and then the control section 200 can transmit the user ID of the user and the device ID of the mirror apparatus 100 to the service server apparatus 300 without performing the authentication of the identity of the user.

After the authentication of the identity of the user, the control section 220 outputs a measurement start signal to the sensor control section 231 in order to perform processing of measuring the health and beauty status of the user with the health and beauty environment sensor section, and controls the components constituting the health and beauty environment sensor section to acquire health and beauty environment information (ST4). The acquired health and beauty environment information is transmitted to the control section 220. The function of acquiring the health and beauty environment information is described above.

The control section 220 stores the acquired health and beauty environment information in association with the user ID in the storage section 213 (ST5). The control section 220 retrieves necessary information linked to the user ID at this point in time, from user information, theme content information, local cache information, and privacy content information in the storage section 213 (ST6). Then, the control section 220 outputs the health and beauty environment information, user information, theme content information, local cache information, and privacy content information to the output control section 212. The output control section 212 can display the information received from the control section 220 on the display screen 113 or can output the information in audio form from the speaker 140.

In transmitting the health and beauty environment information to the service server apparatus 300 over the network, the control section 220 can perform the privacy processing described above to transmit the health and beauty environment information which has been subjected to the privacy processing (quantifying processing) to the service server apparatus 300.

Next, the control section 220 transmits the health and beauty environment information in association with the user ED and the device ID of the mirror apparatus 100 to the service server apparatus 300 (ST7). The control section 320 of the service server apparatus 300 receives the health and beauty environment information at the communication section 311 and stores the information in the storage section 314. At this point, the service server apparatus 300 may perform authentication processing by using the user ID or the device ID.

The control section 320 can stores the received health and beauty environment information in a health and beauty environment information DB of the storage section 314 by using the user ID and the device ID of the mirror apparatus 100 as a key (ST8). As shown in FIG. 6, the control section 320 stores the health and beauty environment information regarding user's health acquired by the health and beauty environment sensor section in time sequence as daily health and beauty environment information of the user. For example, the information can be stored on each date of the acquisition of the health and beauty environment information, or can be stored on each date and at each acquisition time when the health and beauty environment information is acquired a plurality of times in a day.

The control section 320 of the service server apparatus 300 acquires external service content information from the external service server apparatus 400 through the external content acquisition section 312 (ST9). The external content acquisition section 312 stores the external service content information acquired from the external service server apparatus 400 in an external service content information DB of the health and beauty management information. Since the external service content information is used as information common to users, it may be stored not for each user but in a separate database common to the users.

The processing of acquiring the external service content information may be performed not in synchronization with the processing of storing the health and beauty environment information transmitted from the mirror apparatus 100 (control apparatus 200) (a request to store the health and beauty environment information from the mirror apparatus 100). The external service content information such as meteorological information or traffic information can be configured to be acquired at regular time intervals in a day such that the external service content information can be updated to the latest version at any time.

The control section 320 stores, for example, meteorological information on each date in the health and beauty management information stored in time sequence (ST10).

The control section 320 transmits the external service content information acquired from the external service server apparatus 400 to the mirror apparatus 100 (control apparatus 200) through the communication section 311. The control section 320 transmits the external service content information to the mirror apparatus 100 at the time of acquisition of the external service content information or at the time of delivery specified in advance (ST11).

Upon reception of the external service content information from the service server apparatus 300, the control section 220 of the control apparatus 200 stores the external service content information in the storage section 213 as local cache information (ST12). When the human detection sensor 150 detects that the user is present within the sensing range of the mirror apparatus 100, the control section 220 can perform control to output the received external service content information to the output control section 212 for display on the display screen 113 or for audio output.

The control section 320 of the service server apparatus 300 performs control to extract the past health and beauty environment information acquired over a certain time period necessary for time-series data analysis and the preceding time-series data analysis information for each user ID to perform time-series data analysis processing. The time-series data analysis section 331 performs time-series data analysis (ST13) based on the latest health and beauty environment information, the extracted past health and beauty environment information, and the preceding time-series data analysis information, and stores the analysis result (for example, a data time-series movement pattern) in the storage section 314.

Next, description is made of processing of acquiring a health and beauty action of the user (ST14). FIG. 12 is a diagram showing a processing flow of acquiring an action status of the user regarding health and beauty in the health information service system according to the present embodiment.

As shown in FIG. 12, the control section 220 of the control apparatus 200 performs control such that health and beauty environment information is measured by the health and beauty environment sensor section (S101), and acquires the health and beauty environment information measured before performance of a health and beauty action from the health and beauty environment sensor section and stores the information in association with the user ID in the storage section 213 (S102).

The control section 220 acquires a predetermined health and beauty action content stored in the storage section 213 and controls the output control section 212 to reproduce the predetermined health and beauty action content (S103). With the reproduction of the health and beauty action content, the control section 220 controls the user action recognition section 233 to start processing of recognizing the health and beauty action being performed by the user (S104).

The user action recognition section 233 calculates location information of each region such as user's face, arm and leg, and torso in images or videos taken by the camera 120 or acquired by the motion sensor, matches the location information with the corresponding positions in displayed data of the health and beauty action content displayed on the display screen 113, and makes a measurement to determine whether or not the user is performing the health and beauty action in synchronization with the health and beauty action content being reproduced. The control section 220 displays the result of recognition of the health and beauty action content and the user (for example, information about the health and beauty action being performed, performance or nonperformance, performance start time, performance end time, number of performances, and performance score) together with the health and beauty action content being reproduced on the display screen 113 (S105).

When the reproduction of the health and beauty action content is completed (YES at 106), the control section 220 performs control to display the result of recognition performed in the user action recognition section 233, for example, the progress or completion of the health and beauty action of the user on the display screen 113, and performs processing of acquiring health and beauty environment information with the health and beauty environment sensor section.

The control section 220 stores the result of recognition of the health and beauty action and the health and beauty environment information before and after the health and beauty action in association with the user ID in the local cache information (S107). At this point, the control section 220 can perform control to display the health and beauty environment information and changes in health and beauty status before and after the health and beauty action on the display screen 113.

The control section 220 transmits the information of the health and beauty action performed by the user and the health and beauty environment information before and after the health and beauty action in association with the user ID and the device ID of the mirror apparatus 100 to the service server apparatus 300 (S108). When the user continues the health and beauty action after the reproduction of the health and beauty action content is completed, the control section 220 may be configured to continue the recognition processing in the user action recognition section 233 until the user finishes the health and beauty action.

Upon reception of the user ID, the device ID, the health and beauty environment information before and after the health and beauty action, and the health and beauty action information at the communication section 311, the service server apparatus 300 stores them in association with the health and beauty environment information and the health and beauty action information in the storage section 314 (ST15 in FIG. 10).

The control section 320 of the service server apparatus 300 performs control to perform processing of evaluating the performance effect of a health and beauty action. The performance effect evaluation section 332 reads out health and beauty environment information on a predetermined date or within a predetermined time period stored in a health and beauty action information DB and health and beauty action information recorded in the health and beauty action information DB. The performance effect evaluation processing may be performed by taking account of the meteorological information recorded in the external service content information DB or the living activity record recorded in a personal preference evaluation DB.

For example, the performance effect evaluation section 332 extracts a health and beauty action performed by the user when a time-series change pattern is extracted by the time-series data analysis section 331 before and after the health and beauty action based on the action history, and uses the health and beauty environment information before and after the health and beauty action to produce performance effect evaluation information for the extracted health and beauty action (ST16). As described above, the performance effect evaluation section 332 may extract a health and beauty action not performed by the user when a time-series pattern is extracted in a nonperformance period of the health and beauty action based on the action history and may use the health and beauty environment information in the non-performance period to produce non-performance effect evaluation information for the extracted health and beauty action. The time-series pattern includes a time-series pattern representing no change of the health and beauty status of the user.

The control section 320 stores the produced performance effect evaluation information in the health and beauty action information DB of the storage section 314 (ST17) and transmits the user ID, the device ID, and the performance effect evaluation result of the health and beauty action to the mirror apparatus 100 (control apparatus 200) (ST18).

The control section 220 of the control apparatus 200 stores the user ID and the performance effect evaluation result of the health and beauty action received from the service server apparatus 300 in the local cache information of the storage section 213 (ST19). The control section 220 can perform control to display the received performance effect evaluation result of the health and beauty action on the display screen 113, and the output control section 212 displays the performance effect of the health and beauty action on the display screen 113 to the user based on an instruction from the control section 220.

Next, description is made of user preference acquisition processing and user preference evaluation processing. The control section 220 of the mirror apparatus 100 senses a human appearing in front of the mirror apparatus 100 with the human detection sensor 150 and performs authentication to identify a user ID, and then performs control to perform processing of acquiring user preference characteristic information with the user preference acquisition section 236 upon operation by the user or at an active arbitrary time (ST20).

The user preference acquisition section 236 displays a predetermined content for collecting user preference characteristics on the display screen 113 through the output control section 212. The user preference acquisition section 236 acquires the result of response of the user to the user preference characteristics collecting content and stores it in the local cache information of the storage section 213 (ST21).

The control section 220 transmits the user ID, the device ID, user preference characteristic collecting information, and the result of the user response to the user preference characteristic collecting content to the service server apparatus 300 (ST22). The user preference characteristic collecting information is information indicating which user preference characteristics are collected. The user preference characteristic collecting content can be produced by the user preference evaluation section 333 of the service server apparatus 300, and can include a user preference characteristic collecting content ID for identifying each content. Since the response result is transmitted to the service server apparatus 300, it may be configured not to be stored as the local cache information in the storage section 213.

Upon reception of the user ID, the device ID of the mirror apparatus 100, the user preference characteristic collecting information, and the result of the user response to the user preference characteristic collecting content at the communication section 311, the control section 320 of the service server apparatus 300 stores them in the personal preference evaluation DB of the storage section 314 (ST23). As described above, the user preference information may be acquired in the mobile communication apparatus 500, and the service server apparatus 300 may store the result of response of the user to the user preference characteristic collecting content received from the mobile communication apparatus 500 in the personal preference evaluation DB of the storage section 314.

The user preference evaluation section 333 analyzes each information such as living activity record, health and beauty feeling, and health and beauty action preference of each user stored in the personal preference evaluation DB of the storage section 314 periodically or at a predetermined time, and stores the analysis result in association with the user ID in the personal preference evaluation DB (ST24).

In addition, the health and beauty prediction section 334 of the service server apparatus 300 can perform health and beauty prediction processing of predicting health and beauty information of the health and beauty environment information DB and health and beauty feeling information of the personal preference evaluation DB at a predetermined time from the menstrual cycle prediction of health and beauty information of the health and beauty environment information DE, the meteorological forecast of the external service content information DB periodically acquired from the external service server apparatus 400, and the action planning of the personal preference evaluation DB (ST25). As shown in FIG. 7, health and beauty prediction information obtained through the health and beauty prediction processing is stored in the storage section 314, and the control section 320 transmits the produced health and beauty prediction information to the mirror apparatus 100 (control apparatus 200) at an arbitrary time. The control section 220 of the control apparatus 200 stores the received health and beauty prediction information in the storage section 213 and performs control to display the health and beauty prediction information on the display screen 113 in response to a user operation or at a predetermined time.

The recommendation section 335 of the service server apparatus combines, at a predetermined time, the result of time-series data analysis in the time-series data analysis section 331, the result of performance effect evaluation of health and beauty actions in the performance effect evaluation section 332, the result of user preference characteristics evaluation in the user preference evaluation section 333, the result of prediction of health and beauty status and health and beauty feeling in the health and beauty prediction section 334, the result of collective intelligence analysis in the collective intelligence data analysis section 337, and the information about the type of device held by the user recorded in the user terminal management information to perform recommendation processing of producing recommendation information indicating selection, performance/nonperformance, and introduction timing of health and beauty actions, health and beauty commodities, and health and beauty services appropriate for each user (ST26), and records the recommendation information in the storage section 314. The control section 320 transmits the produced recommendation information to the mirror apparatus 100 (control apparatus 200) at an arbitrary time. The control section 220 of the control apparatus 200 stores the received recommendation information in the storage section 213, and can display the recommendation information on the display screen 113 in response to a user operation or at a predetermined time or can add, update, or correct a health and beauty action content based on the recommendation information.

The personal learning and planning section 336 produces a plan to deliver and reproduce a health and beauty service content for transmission to the user as shown in FIG. 8 based on the recommendation information produced in the recommendation section 335 (ST27) and stores the plan in the health and beauty action information DB of the storage section 314. The control section 320 transmits the produced health and beauty planning information to the mirror apparatus 100 (control apparatus 200) at an arbitrary time. The control section 220 of the control apparatus 200 stores the received health and beauty planning information in the storage section 213 and can display the recommendation information on the display screen 123 in response to a user operation or at a predetermined time.

The collective intelligence data analysis section 337 performs collective intelligence analysis processing of grouping a plurality of users satisfying a predetermined condition at a predetermined time and analyzing average movements or change patterns on each date or within a predetermined time period from health and beauty information of the health and beauty environment information DB, living activity record of the personal preference evaluation DB, and the health and beauty tendency stored in the storage section 314 (ST28). The analysis result from the collective intelligence analysis processing is stored in the storage section 314 as numerical value information within a user group such as average, highest value, and lowest value for each day or as characteristic information such as average movements or change patterns in a predetermined time period for each user group attribute (predetermined condition), similarly to the configuration of the health and beauty environment information DB and the personal preference evaluation DB.

As described above, the health information service system according to the present embodiment is configured to include the mirror apparatus 100 including the mirror (for example, the half mirror 111) configured to reflect the mirror image of the user located in front of the mirror, the display panel 112 provided on the rear side or front side of the mirror and configured to display various types of information, and the imaging apparatus (camera 120) configured to take images of regions of the body of the user who is reflected in the mirror, the mirror apparatus 100 being installed in a house where the user lives or a place which the user visits, the measurement device (the camera 120, the sensor device 160, the health and beauty measurement apparatus 170) configured to measure the health and beauty status of the user who uses the mirror apparatus 100, the control apparatus 200 configured to control the measurement device and the mirror apparatus 100, and the service server apparatus 300 connected to the control apparatus 200 over the network.

The service server apparatus 300 associates health and beauty measurement information acquired by the measurement device with the status of the action regarding health and beauty of the user imaged by the imaging apparatus and stores the health and beauty measurement information and the action status daily in time sequence, and has the time-series data analysis section configured to extract the time-series pattern representing a change in the health and beauty status of the user or the time-series pattern representing no change in the health and beauty status of the user based on the time-series health and beauty measurement information in the past, and the performance effect evaluation section configured to extract the health and beauty action performed by the user when the time-series pattern is found before and after the health and beauty action of the user based on the history of actions or the health and beauty action not performed by the user when the time-series pattern is found in the nonperformance period of the health and beauty action of the user based on the history of actions and to use the health and beauty measurement information before and after the health and beauty action or the health and beauty measurement information in the nonperformance period to produce performance or nonperformance effect evaluation information about the extracted health and beauty action.

With such a configuration, the health and beauty statuses of the user and the statuses of the actions regarding health and beauty performed by the user can be collected to assist in improvement of health and beauty of the user. Specifically, the mirror apparatus used daily by the user and acquiring the mirror image of the user can be used to collect the statuses of the actions regarding health and beauty of the user, so that the actions regarding health and beauty associated with daily living behaviors and the associated information can be provided to assist in improvement of health and beauty of the user.

In an example of assisting in improvement of health and beauty of the user in this manner, a user A with "high coldness of lower body" uses the health information service system according to the present embodiment in the following flow.

1) The user A takes his/her thermographic images with the infrared camera mounted on the mirror apparatus 100 before and after taking a bath and checks the effect before and after the bath from changes in thermographic image, still image, and thermographic pattern for each body region. The thermographic pattern is transmitted to the service server apparatus 300.

The time-series data analysis section 331 of the service server apparatus 300 analysis time-series data representing changes in thermographic pattern before taking a bath acquired for the last month and recorded in the health and beauty environment information DB, and outputs (analyzes) the degree in which the health and beauty status has become better as seen in the pattern of coldness of lower body changing from high to low. For example, coldness statuses including high coldness, medium coldness, low coldness, and no coldness may be graphed.

3) The performance effect evaluation section 332 of the service server apparatus 300 refers to meteorological information of the external service content information DB and a history of performances of "massage of foot trigger points #2," "supplement #3," and "exercise #1" set to be performed by the user for the purpose of removing "coldness of lower body" recorded in the health and beauty action information DB and performs the performance effect evaluation of those health and beauty actions. Although the atmospheric temperature was generally low and it was often cloudy or rainy, it is determined that the "massage of foot trigger points #2" and "supplement #3" performed almost every day have the effect in which the health and beauty status has become better as seen in 2) from the pattern of coldness of lower body changing from high to low, and it is determined that those health and beauty actions have the effects for the user A at the present time.

4) For "exercise #1" hardly performed since a certain point in time, the user preference evaluation section 333 of the service server apparatus 300 acquires the fact that the user A is bad at and does not like exercise in general through a user preference characteristic collecting content and records the fact in health and beauty action preference information of the personal preference evaluation DB.

5) The recommendation section 335 of the service server apparatus 300 refers to a tendency in health and beauty changes and a ranking of popular health and beauty actions in a group of users with "high coldness of lower body" of the same age and same residence area as the user A calculated in the collective intelligence data analysis section 337 to select a health and beauty content suitable for the user A. In this case, since the fact that the user A is bad at and does not like exercise in general can be found in the personal preference evaluation information, the recommendation section 335 excludes the exercise contents from the preference of the use A and selects a popular commodity content of "ginger honey tea" as a new health and beauty content based on a great interest and a high persistence rate in food-related contents.

6) The time-series data analysis section 331 of the service server apparatus 300 can produce a change pattern of health and beauty status of the user representing occurrence of "high coldness of lower body" on a day when the atmospheric temperature suddenly drops. The health and beauty prediction section 334 can predict that "high coldness of lower body" is likely to occur (produce prediction health and beauty information) on the day when the meteorological forecast predicts a sudden drop in atmospheric temperature. The personal learning and planning section 336 records the fact that a commodity introduction content for "ginger honey tea" should be recorded on the mirror apparatus 100 after the user takes a bath on the day when the sudden drop in atmospheric temperature is predicted.

7) When the recommendation section 335 of the service server apparatus 300 determines that no schedule is present in the action planning of the user A in the evening of the day when the atmospheric temperature suddenly drops based on the previously acquired living behavior planning information, the recommendation section 335 transmits the fact that a "moxibustion lesson" which the user is much interested in has a vacancy on that day and a participation guide as recommendation information to the mobile communication apparatus 500 at the time when the user A leaves the office based on location information of the mobile communication apparatus 500. Since the recommendation section 335 can find that the user is interested in the "moxibustion lesson" in advance from the preference evaluation information of the user, the recommendation section 335 can provide the recommendation information in response to the fact that no schedule is present in the living action planning information and the location information of the mobile communication apparatus 500.

In another example of assisting in improvement of health and beauty of the user, the health information service system according to the present embodiment is applicable to a hair salon as described above. For example, the past hair style of the user acquired by the camera 120 through the mirror apparatus 100 can be stored in the control apparatus 200 or the service server apparatus 300 and can be displayed on the display screen 113 with a mirror image of the user side by side. The user can compare the past hair style with the present hair style to determine the arrangement of his/her hair style under the advice of a hairdresser. It is possible to display images or videos of popular hair styles or hair colors suitable for the shape of the user's face such as a round face, hair styles or hair colors recommended by the hairdresser, or hair styles or hair colors wanted by the user as well.

The camera 120 of a wearable type can acquire the drying or damage degree of user's hair or the scalp condition as health and beauty information of the user (health and beauty environment information). Performance statuses of use of a conditioner for hair, scalp massage, or special treatment for head and hair including massage can be acquired as health and beauty actions of the user through the mirror apparatus 100. The control apparatus 200 can acquire the health and beauty actions of the user with control of an interface for acquiring performance/non-performance of the use of the conditioner or the like through the display screen 113. Then, the performance effect evaluation for the health and beauty actions can be performed as described above by acquiring health and beauty information such as the drying or damage degree of user's hair or the scalp condition before and after the health and beauty actions such as the use of the conditioner.

In the health information service system described above, the recommendation information produced by the recommendation section 335 can be configured to include first recommendation information produced according to the location information of the mobile communication apparatus 500 and second recommendation information associated with the first recommendation information, different from the first recommendation information, and provided for transmission to the mirror apparatus 100. For example, as shown in FIG. 13A, the service server apparatus 300 starts recommendation processing (ST26_1) and acquires location information from the mobile communication apparatus 500 of the user (ST29, ST26_2). When the user is absent at the location where the mirror apparatus 100 is installed (NO at ST26_3), for example, the service server apparatus 300 can extract (retrieve) aesthetic salon information for face massage serving as a health and beauty action content based on the location information as recommendation information (ST26_4) instead of a health and beauty action content representing face massage to be provided for the mirror apparatus 100, and provides the information for the mobile communication apparatus 500 (ST26_5). When the user is present at the location where the mirror apparatus 100 is installed (YES at ST26_3), the service server apparatus 300 can transmit the recommendation information only to the mirror apparatus 100 or can transmit the recommendation information to the mobile communication apparatus 500 as well as the mirror apparatus 100. In this manner, the recommendation section 335 can be configured to select as appropriate the recommendation information based on the user location information acquired from the mobile communication apparatus 500 and transmit the selected information to the mobile communication apparatus 500 or the mirror apparatus 100 (ST26_6, ST26_7). The location information of the mirror apparatus 100 can be stored (acquired) in advance as user terminal management information shown in FIG. 5 in association with the device ID, for example.

The recommendation section 335 can provide different recommendation information pieces for the mobile communication apparatus 500 based on user location information acquired from the mobile communication apparatus 500. In this case, each of the recommendation information pieces can be stored in association with different location information of the mobile communication apparatus 500. As shown in FIG. 13B, the recommendation section 335 starts recommendation processing (ST26_8), and first acquires location information from the mobile communication apparatus 500 of the user present at a position A (ST29_1, ST26_9). Based on the position A of the user acquired from the mobile communication apparatus 500, the recommendation section 335 can extract recommendation information A associated with the corresponding location information from the plurality of recommendation information pieces and transmit the recommendation information A to the mobile communication apparatus 500 (ST26_10, ST26_11). The recommendation section 335 also acquires location information from the mobile communication apparatus 500 of the user present at a position B different from the position A (ST29_2, ST26_12). Based on the position B of the user acquired from the mobile communication apparatus 500, the recommendation section 335 extracts recommendation information B associated with the corresponding location information from the plurality of recommendation information pieces (ST26_13). The recommendation information B is different from the recommendation information A. The recommendation section 335 can transmit the recommendation information B to the mobile communication apparatus 500 of the user present at the position B (ST26_14). For example, in accordance with the user location information, information about an aesthetic salon near the location where the user is present can be provided as recommendation information for the mobile communication apparatus 500. In addition, aesthetic salon information or gym information can be provided in accordance with the location information.

As described above, the mobile communication apparatus 500 of the user can have the measurement function of measuring health and beauty statuses of the user and the action status acquirement function of acquiring a history of actions regarding health and beauty performed by the user, similarly to the mirror apparatus 100 and the control apparatus 200. Thus, the health information service system according to the present embodiment can be configured to acquire the measurement information representing health and beauty status measurements and the history of actions of the user from both the mirror apparatus 100 and the mobile communication apparatus 500, and the service server apparatus 300 can provide the health information service described above as appropriate for one or both of the mirror apparatus 100 and the mobile communication apparatus 500.

The mobile communication apparatus 500 of the user can acquire location information in acquiring health and beauty environment information or in acquiring a history of actions regarding health and beauty performed by the user. The mobile communication apparatus 500 can transmit the acquired health and beauty environment information, health and beauty action information, location information, user ID, and device ID in association with each other to the service server apparatus 300. The service server apparatus 300 can stores the health and beauty environment information and the health and beauty action information associated with the user ID, the device ID, and the location information in the storage section 314. The service server apparatus 300 can perform a time series analysis of correlation between the health and beauty action information and the location information representing the performance location of the action to calculate a personal tendency and can provide the user with a recommendation content for each location information suitable for the personal tendency.

For example, as shown in FIG. 14, upon acquisition of health and beauty action information (ST31), the mobile communication apparatus 500 acquires location information associated therewith. The mobile communication apparatus 500 transmits the user ID, the device ID of the mobile communication apparatus 500, the health and beauty action information, and the location information to the service server apparatus 30 (ST32). The service server apparatus 300 stores the health and beauty action information and the location information representing the performance location of the health and beauty action in the storage section 314 in association with the user ID and the device ID (ST33).

The service server apparatus 300 performs performance effect evaluation for the location information of the health and beauty action (ST34) and stores performance effect evaluation result information in the storage section 314 (ST35). The mobile communication apparatus 500 acquires user preference about the health and beauty action (ST36) and then transmits the acquired user preference information to the service server apparatus 300 (ST37). The service server apparatus 300 stores the acquired user preference information in the storage section 314 (ST38). The service server apparatus 300 evaluates the user preference of that user from the user preference information, health and beauty action, and location information to evaluate a personal preference tendency including the location information, user preference, and health and beauty action (ST39). For example, from location information recorded together with the performance of a health and beauty action, the service server apparatus 300 can find the location where the user has performed the health and beauty action, and from preference information in performing a health and beauty action, the service server apparatus 300 can find the location where the user likes to perform the action.

The service server apparatus 300 selects a health and beauty content recommended to the user in light of the location information based on the performance effect evaluation information of the health and beauty action for the location information and the personal preference tendency (ST40). For example, from the current location information of the user acquired from the mobile communication apparatus 500, the service server apparatus 300 can find the location of performance of a health and beauty action in the past and the health and beauty action performed at that location by choice. Thus, based on the current position of the user and the location information associated with the history of actions, the recommendation section 335 can extract, as recommendation information, a health and beauty action which can be performed by the user at the current position and transmit it to the mobile communication apparatus 500. The service server apparatus 300 can produce a personal study plan to allow reproduction of the health and beauty content in predetermined location information suitable for the user preference and record the plan together with predetermined location information in a health and beauty content planning DB of the storage section 314 (ST41).

Since the mobile communication apparatus 500 of the user can have the measurement function of measuring health and beauty statuses of the user and the action status acquirement function of acquiring a history of actions regarding health and beauty performed by the user, similarly to the mirror apparatus 100 and the control apparatus 200, the health information service system according to the present embodiment can be formed of the mobile communication apparatus 500 and the service server apparatus 300. Thus, in the processing flow of the health information service system according to the present embodiment shown from FIG. 9 to FIG. 11, the mobile communication apparatus 500 can perform processing similar to that performed by the mirror apparatus 100 (control apparatus 200) independently of or in parallel with the mirror apparatus 100 (control apparatus 200).

Although the mirror apparatus 100 and the control apparatus 200 are described as separate entities, they may be integrated. One control apparatus 200 may be provided for a plurality of mirror apparatuses 100. In this case, each of the mirror apparatuses has a device ID and the control apparatus 200 identifies the mirror apparatus 100 connected thereto or communicating wirelessly therewith by the device ID. The health and beauty measurement apparatus 170 may also be integrated with the mirror apparatus 100. In addition, the mirror apparatus 100 and the service server apparatus 300 may be integrated.

The processing in each of the control apparatus 200, the mobile communication apparatus 500, and the service server apparatus 300 forming the health and beauty assisting system according to the present embodiment may be realized by a program executable in a computer, and the computer having the program installed thereon may operate as an information processing apparatus which performs each processing in the system according to the present embodiment. For example, the program may be stored in an auxiliary storage apparatus, not shown, and a control section such as a CPU may read out the program stored in the auxiliary storage apparatus to a main storage apparatus, the control section may execute the program read out to the main storage apparatus to cause the computer to perform each processing according to the embodiment.

The program can be recorded on a computer readable recording medium and provided for a computer or downloaded to the computer over a network such as the Internet. The computer readable recording medium includes an optical disk such as a CD-ROM, a phase change optical disk such as a DVD-ROM, a magneto-optical disk such as a Magneto-Optical (MO) disk and MD (Mini-Disk), a magnetic disk such as a Floppy® disk and removable hard disk, and a memory card such as a Compact Flash®, SmartMedia, SD memory card, and memory stick. A hardware apparatus such as an integrated circuit (including IC chip) designed and configured particularly for the purpose of the present invention is included in the recording medium.

Although the preferred embodiment of the present invention has been described, that embodiment is illustrative and is not intended to limit the scope of the present invention. The novel embodiment can be implemented in various other forms, and various omissions, substitutions, and modifications can be made thereto without departing from the spirit or scope of the present invention. The embodiment and its variations are encompassed within the spirit or scope of the present invention and within the invention set forth in the claims and the equivalents thereof.

DESCRIPTION OF THE REFERENCE NUMERALS

100 MIRROR APPARATUS
111 HALF MIRROR
112 DISPLAY PANEL
113 DISPLAY SCREEN
120 CAMERA
130 MICROPHONE
140 SPEAKER
150 HUMAN DETECTION SENSOR
160 SENSOR DEVICE
170 HEALTH AND BEAUTY MEASUREMENT APPARATUS
200 CONTROL APPARATUS
211 COMMUNICATION SECTION
212 OUTPUT CONTROL SECTION
213 STORAGE SECTION
220 CONTROL SECTION
231 SENSOR CONTROL SECTION
232 MEASUREMENT DATA ANALYSIS SECTION
233 USER ACTION RECOGNITION SECTION
234 USER OPERATION RECOGNITION SECTION
235 AR CONTROL SECTION
236 USER PREFERENCE ACQUISITION SECTION
300 SERVICE SERVER APPARATUS
311 COMMUNICATION SECTION
312 EXTERNAL CONTENT ACQUISITION SECTION
313 OUTPUT CONTROL SECTION
314 STORAGE SECTION
320 CONTROL SECTION

331 TIME-SERIES DATA ANALYSIS SECTION
332 PERFORMANCE EFFECT EVALUATION SECTION
333 USER PREFERENCE EVALUATION SECTION
334 HEALTH AND BEAUTY PREDICTION SECTION
335 RECOMMENDATION SECTION
336 PERSONAL LEARNING AND PLANNING SECTION
337 COLLECTIVE INTELLIGENCE DATA ANALYSIS SECTION
400 EXTERNAL SERVICE SERVER APPARATUS
500 MOBILE COMMUNICATION APPARATUS
510 DISPLAY SECTION
521 CAMERA
522 SENSOR DEVICE
523 MICROPHONE
524 SPEAKER
530 CONTROL SECTION
531 COMMUNICATION SECTION
532 OUTPUT CONTROL SECTION
533 LOCATION INFORMATION ACQUISITION SECTION
534 STORAGE SECTION
535 SENSOR CONTROL SECTION
536 MEASUREMENT DATA ANALYSIS SECTION
537 USER ACTION RECOGNITION SECTION
538 USER PREFERENCE ACQUISITION SECTION

The invention claimed is:

1. A health information service system comprising:

a measurement apparatus configured to measure a health and beauty status of a user, a mirror apparatus having a first processor configured to acquire a history of actions regarding health and beauty performed by the user, and a server connected over a network to the measurement apparatus and the first processor, wherein the server includes:

a storage device configured to associate health and beauty measurement information about health and beauty of the user acquired by the measurement apparatus with the history of actions and to store the health and beauty measurement information and the history of actions of the user daily in time sequence; and a second processor configured to extract a time-series pattern representing a change of the health and beauty status of the user or a time-series pattern representing no change of the health and beauty status of the user based on the time-series health and beauty measurement information in the past and extract the health and beauty action performed by the user when the time-series pattern is found before and after the health and beauty action of the user based on the history of actions or the health and beauty action not performed by the user when the time-series pattern is found in a nonperformance period of the health and beauty action of the user based on the history of actions and to use the health and beauty measurement information before and after the health and beauty action or the health and beauty measurement information in the nonperformance period to produce performance or nonperformance effect evaluation information about the extracted health and beauty action, wherein the mirror apparatus further includes a mirror configured to reflect a mirror image of the user located in front of the mirror, a display panel provided on a front side or a rear side of the mirror and configured to display various types of information, and an imaging apparatus configured to take an image of each region of a body of the user who is reflected in the mirror, the mirror apparatus being installed in a house where the user lives or a place which the user visits, and wherein the first processor is configured to show display data for guiding the health and beauty action on the display panel, to image an action status of the user moving to match the display data with the imaging apparatus, and to transmit an action history of the user imaged on the basis of the display data to the server.

2. The health information service system according to claim 1, wherein the mirror apparatus is formed of a half mirror configured to reflect the mirror image of the user located in front and a display panel provided on a rear side of the half mirror and configured to output predetermined display light to be transmitted through the half mirror.

3. The health information service system according to claim 1, wherein the mirror apparatus is formed of a mirror configured to reflect the mirror image of the user located in front and a display panel provided on a front side of the mirror and formed of a transparent display.

4. The health information service system according to any one of claims 1 to 3, wherein:

the measurement apparatus includes the imaging apparatus as a measurement device configured to measure the health and beauty status of the user, and the imaging apparatus images a visible image, a near-infrared image, or a thermographic image, or video of the user, and the first processor is configured to perform control to quantify data of the image or the video based on quantifying information preset for the image or video to produce the health and beauty measurement information and to transmit the quantified health and beauty measurement information to the server over the network, and not to transmit the image data before the quantification to the server.

5. The health information service system according to claim 1, wherein:

the storage device is configured to store the health and beauty measurement information and the history of actions daily, and meteorological information or a living activity record of the user in association with each other, and the second processor configured to extract the time-series pattern and to extract the meteorological information or the living activity record related to the extracted time-series pattern as a factor in the change of the health and beauty status, the second processor is further configured to produce, based on forecast information on the meteorological information or living behavior planning information corresponding to the living activity record acquired in advance, prediction health and beauty measurement information of the user from the past health and beauty measurement information associated with the forecast information or the past health and beauty measurement information associated with the living behavior planning information.

6. The health information service system according to claim 1, wherein the second processor is further configured to produce predetermined recommendation information based on the health and beauty measurement information, the time-series pattern, the history of actions or preference information of the user acquired in advance.

7. The health information service system according to claim 5, wherein the second processor is further configured to produce predetermined recommendation information based on the health and beauty measurement information, the time-series pattern, the history of actions or preference information of the user acquired in advance, and the prediction health and beauty measurement information.

8. The health information service system according to claim 1, wherein the second processor is further configured to produce predetermined recommendation information based on the health and beauty measurement information, the time-series pattern, the history of actions or preference information of the user acquired in advance, and to transmit the recommendation information to the mirror apparatus for display on the display panel, wherein the recommendation information is configured to include first recommendation information produced according to location information of a mobile communication apparatus held by the user connectable to the server over a network and second recommendation information associated with the first recommendation information, different from the first recommendation information, and provided for transmission to the mirror apparatus, and the second processor is configured to select the first recommendation information or the second recommendation information based on location information of the user acquired from the mobile communication apparatus and to transmit the selected recommendation information to the mobile communication apparatus or the mirror apparatus.

9. The health information service system according to claim 1, wherein:

the storage device is configured to store the health and beauty measurement information and the history of actions daily, and meteorological information or a living activity record of the user in association with each other, the second processor is configured to extract the time-series pattern and to extract the meteorological information or the living activity record related to the extracted time-series pattern as a factor in the change of the health and beauty status, the second processor further configured to:

produce, based on forecast information on the meteorological information or living behavior planning information corresponding to the living activity record acquired in advance, prediction health and beauty measurement information of the user from the past health and beauty measurement information associated with the forecast information or the past health and beauty measurement information associated with the living behavior planning information; and produce predetermined recommendation information based on the health and beauty measurement information, the time-series pattern, the history of actions or preference information of the user acquired in advance, the prediction health and beauty measurement information, and to transmit the recommendation information to the mirror apparatus for display on the display panel, wherein the recommendation information is configured to include first recommendation information produced according to location information of a mobile communication apparatus held by the user connectable to the server over a network and second recommendation information associated with the first recommendation information, different from the first recommendation information, and provided for transmission to the mirror apparatus, and the second processor is configured to select the first recommendation information or the second recommendation information based on location information of the user acquired from the mobile communication apparatus and to transmit the selected recommendation information to the mobile communication apparatus or the mirror apparatus.

10. A health information service system comprising:

a mobile communication apparatus held by a user includes a first processor configured to:

measure a health and beauty status of the user, and acquire a history of actions regarding health and beauty performed by the user; and a server connected over a network to the mobile communication apparatus, wherein the server includes:

a storage device configured to associate health and beauty measurement information about health and beauty of the user acquired by the mobile communication apparatus with the history of actions and to store the health and beauty measurement information and the history of actions of the user daily in time sequence; and a second processor configured to extract a time-series pattern representing a change of the health and beauty status of the user or a time-series pattern representing no change of the health and beauty status of the user based on the time-series health and beauty measurement information in the past, extract the health and beauty action performed by the user when the time-series pattern is found before and after the health and beauty action of the user based on the history of actions and to use the health and beauty measurement information before and after the health and beauty action to produce performance effect evaluation information about the extracted health and beauty action, and produce predetermined recommendation information based on the health and beauty measurement information, the time-series pattern, the history of actions, the performance effect evaluation information, or preference information of the user acquired in advance, the recommendation information comprises a plurality of recommendation information pieces, each of the recommendation information pieces being associated with different location information of the mobile communication apparatus, and the second processor is configured to extract, based on location information of the user acquired from the mobile communication apparatus, recommendation information associated with the location information from the plurality of recommendation information pieces and to transmit the extracted recommendation information to the mobile communication apparatus.

11. A health information service system comprising:

a mobile communication apparatus held by a user includes a first processor configured to:

measure a health and beauty status of the user, acquire a history of actions regarding health and beauty performed by the user, and acquire location information, and a server connected over a network to the mobile communication apparatus, wherein the server includes:

a storage device configured to associate health and beauty measurement information about health and beauty of the user acquired by the mobile communication apparatus with the history of actions, to store the health and beauty measurement information and the history of actions of the user daily in time sequence, and to store location information associated with the history of actions, the location information indicating a position of performance of a health and beauty action of the user based on the history of actions;

a second processor configured to extract a time-series pattern representing a change of the health and beauty status of the user or a time-series pattern representing no change of the health and beauty status of the user based on the time-series health and beauty measurement information in the past, extract the health and beauty action performed by the user when the time-series pattern is found before and after the health and beauty action of the user based on the history of actions and to use the health and beauty measurement information before and after the health and beauty action to produce performance effect evaluation information about the extracted health and beauty action, and produce predetermined recommendation information based on the health and beauty measurement information, the time-series pattern, the history of actions, the performance effect evaluation information, preference information of the user acquired in advance, or the location information associated with the history of actions, and the second processor is configured to use current location information of the user acquired from the mobile communication apparatus and the location information associated with the history of actions, to extract, as the recommendation information, the health and beauty action which can be performed at a current position of the user based on the history of actions, and to transmit the extracted recommendation information to the mobile communication apparatus.

12. A health information service system comprising:

a mirror apparatus including a mirror configured to reflect a mirror image of a user located in front of the mirror, and a display panel provided on a front side or a rear side of the mirror and configured to display health and beauty measurement information regarding health and beauty of the user acquired by a measurement apparatus;

a storage device configured to store the health and beauty measurement information and a history of actions regarding health and beauty performed by the user in connection with the acquisition of the health and beauty measurement information in association with each other; and a processor configured to extract the health and beauty measurement information in a nonperformance period of a health and beauty action based on the history of actions from the storage device and to display the extracted information on the display panel.

13. A health information service system comprising:

a measurement apparatus configured to measure a health and beauty status of a user, a first processor configured to acquire a history of actions regarding health and beauty performed by the user, and a server connected over a network to the measurement apparatus and the first processor, wherein the server includes:

a storage device-configured to associate health and beauty measurement information about health and beauty of the user acquired by the measurement apparatus with the history of actions and to store the health and beauty measurement information and the history of actions of the user daily in time sequence; and a second processor configured to extract a time-series pattern representing a change of the health and beauty status of the user or a time-series pattern representing no change of the health and beauty status of the user based on the time-series health and beauty measurement information in the past and extract a first health and beauty action not performed by the user when the time-series pattern is found in a nonperformance period of a health and beauty action of the user based on the history of actions and to use the health and beauty measurement information in the nonperformance period to produce nonperformance effect evaluation information about the first health and beauty action.

* * * * *

UNITED STATES PATENT AND TRADEMARK OFFICE

CERTIFICATE OF CORRECTION

PATENT NO. : 10,062,163 B2
APPLICATION NO. : 15/301093
DATED : August 28, 2018
INVENTOR(S) : Shingo Miyazaki It is certified that error appears in the above-identified patent and that said Letters Patent is hereby corrected as shown below:

In the Claims

Claim 5, Column 38, Line 47, change “the second processor configured to extract” to --the second processor is configured to extract--.

Signed and Sealed this
Eighth Day of January, 2019

Andrei Iancu
*Director of the United States Patent and Trademark Office*